United States Patent
Miyanabe et al.

(10) Patent No.: US 7,791,991 B2
(45) Date of Patent: Sep. 7, 2010

(54) INFORMATION REPRODUCING APPARATUS, INFORMATION REPRODUCING METHOD, INFORMATION REPRODUCING PROGRAM, AND INFORMATION RECORDING MEDIUM

(75) Inventors: Shogo Miyanabe, Tokorozawa (JP); Hiroki Kuribayashi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 495 days.

(21) Appl. No.: 11/884,711

(22) PCT Filed: Feb. 28, 2006

(86) PCT No.: PCT/JP2006/303690

§ 371 (c)(1),
(2), (4) Date: Aug. 20, 2007

(87) PCT Pub. No.: WO2006/093119

PCT Pub. Date: Sep. 8, 2006

(65) Prior Publication Data

US 2008/0165650 A1     Jul. 10, 2008

(30) Foreign Application Priority Data

Mar. 2, 2005    (JP) .............................. 2005-057548

(51) Int. Cl.
*G11B 7/00*    (2006.01)

(52) U.S. Cl. .................... 369/47.1; 369/47.19

(58) Field of Classification Search ................ 369/47.1, 369/59.16, 59.17, 59.19, 59.22, 59.26, 47.35, 369/47.15, 47.17, 47.19, 47.2, 47.25, 47.26, 369/47.48

See application file for complete search history.

(56) References Cited

U.S. PATENT DOCUMENTS 7,038,869 B2 * 5/2006 Miyashita et al. ............. 360/31

FOREIGN PATENT DOCUMENTS

| JP | 4-177668 | 6/1992 |
|----|----------|--------|
| JP | 8-287623 | 11/1996 |
| JP | 9-213009 | 8/1997 |
| JP | 10-125010 | 5/1998 |
| JP | 2002-150686 | 5/2002 |

\* cited by examiner

*Primary Examiner*—Nabil Z Hindi
(74) *Attorney, Agent, or Firm*—Drinker Biddle & Reath LLP

(57) ABSTRACT

The present invention provides an information reproducing apparatus capable of preventing occurrence of erroneous detection as if a recording pit longer than the longest pit in the standard exists on an optical disk even in the case where the difference between frequency of a reproduction signal and frequency of a reproduction clock signal becomes large.

When the difference between frequency of a detection signal Sp detected from an optical disk DK and frequency of a reproduction clock signal Scl becomes large, for example, the gain of a high frequency band corresponding to a recording pit length in the range of 2T to 4T is emphasized more than normal one by an equalizer 2, and the resultant is used for detecting a longest-pit-length error.

8 Claims, 12 Drawing Sheets

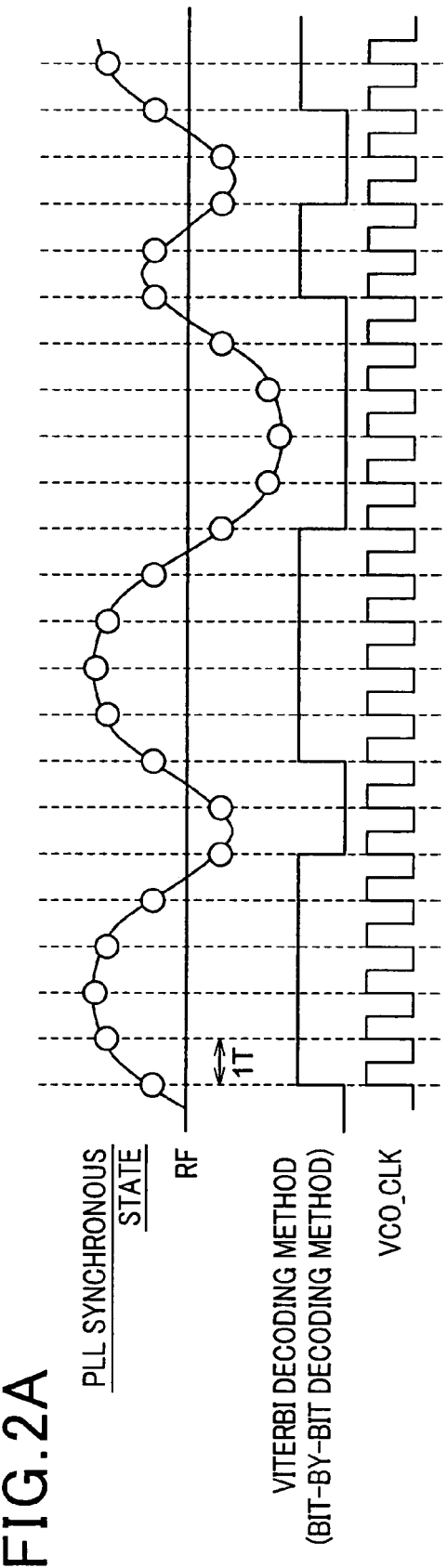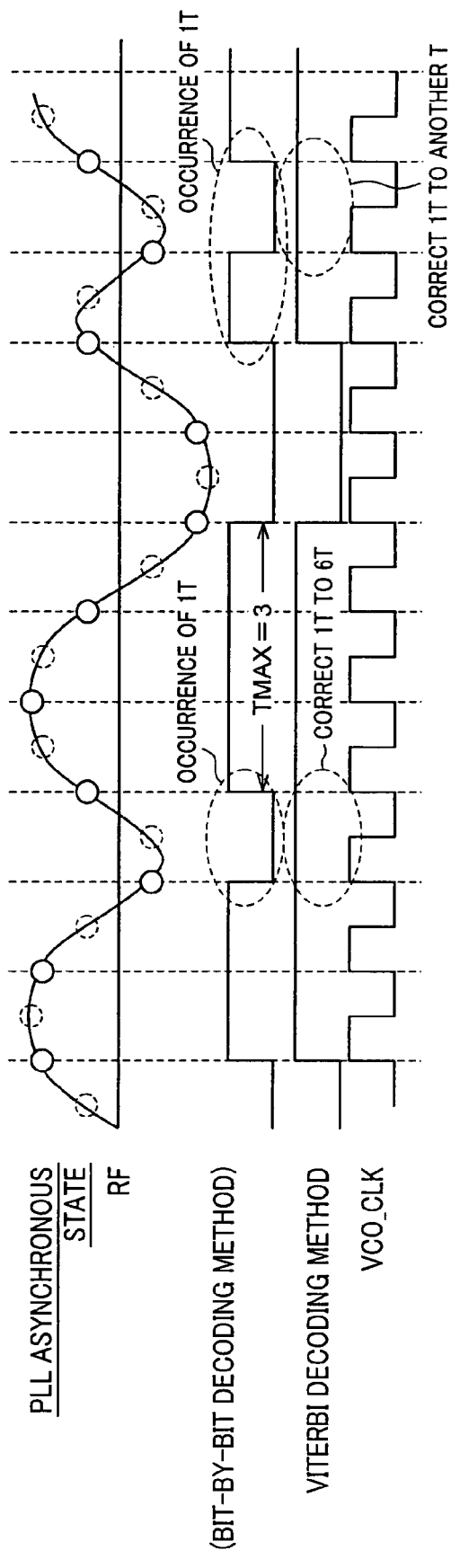

INFORMATION REPRODUCING APPARATUS, INFORMATION REPRODUCING METHOD, INFORMATION REPRODUCING PROGRAM, AND INFORMATION RECORDING MEDIUM

TECHNICAL FIELD

The present invention belongs to the technical field of an information reproducing apparatus, an information reproducing method, an information reproducing program, and an information recording medium. More particularly, the invention belongs to the technical field of an information reproducing apparatus and an information reproducing method for reproducing information recorded on the recording medium by using a recording pit from the recording medium on a disk, an information reproducing program used for the information reproducing process, and an information recording medium on which the information reproducing program is recorded.

BACKGROUND ART

Hitherto, as a recording medium for digitally recording AV (Audio Visual) information such as an image and sound, an optical disc such as a CD (Compact Disc) or a DVD (Digital Versatile Disc) is generally used. In the optical disc, information corresponding to the AV information is recorded as a number of recording pits (also referred to as recording marks in a write-once or rewritable optical disc) having lengths in the circumferential direction corresponding to binary data of "0" or "1" on an information recording surface in a state where they are synchronized with the frequency of a preset recording clock signal.

Therefore, to optically accurately reproduce the AV information from such an optical disk, the timing (time relation) between a reproduction signal detected from an optical beam emitted to the optical disk and a reproduction clock signal generated on the optical disc player side as a reference of the reproducing process has to be the same as the timing (time relation) between a recording signal recorded on the optical disk (a recording signal corresponding to the AV information) and the recording clock signal used at the time of recording the recording signal on the optical disk. Since the recording signal and the recording clock signal have to be synchronized with each other as described above, the reproduction signal and the reproduction clock signal have to be also synchronized. To make the frequency of the reproduction clock signal synchronized with that of the reproduction signal, conventionally, the configuration of synchronizing the frequency of the reproduction clock signal with the frequency of the reproduction signal by using a so-called phase locked loop (PLL) circuit is used.

On the other hand, many of optical discs record AV information in a so-called CLV (Constant Line Velocity) method. However it is known that, in an optical disk on which AV information is recorded in the CLV method, in the case of retrieving information by moving an optical spot directly from the innermost radius side to the outermost radius side or directly from the outermost radius side to the outermost radius side, the difference between the frequency of a reproduction signal and the frequency of a reproduction clock signal principally becomes large immediately after the movement. When the difference increases, accurate reproducing process cannot be performed. With respect to the point, hitherto, as described in Japanese Unexamined Patent Application Publication No. H10-125010, by changing the rotation speed of a spindle motor (a spindle motor for rotating an optical disk itself) on the basis of expected linear velocity in a position on the optical disk after the retrieval, the difference between the frequency of the reproduction clock signal and the frequency of the reproduction signal is reduced.

However, generally, the response to a change in the rotation speed of the spindle motor is often slow. Consequently, in the case of retrieving information at high speed in the above-described range, even with the conventional method of predicting linear velocity in a position after the retrieval, the difference between the frequency of the reproduction clock signal and the frequency of the reproduction signal is still large.

In the case where the difference between the frequency of the reproduction signal and the frequency of the reproduction clock signal becomes large, the frequencies cannot be synchronized only by the conventional PLL circuit. Therefore, conventionally, the interval between synchronization signals (hereinafter, also properly referred to as "sync signals") included in a reproduction signal or the length of the longest recording pit (hereinafter, the longest recording pit is also properly referred to as "longest pit") is detected, the frequency of the reproduction clock signal is controlled by using the detected interval, length, or the like to reduce the difference between the frequency of the reproduction clock and the frequency of the reproduction signal to some extent and, after that, the sync control by the PLL circuit is performed.

In the case of controlling the frequency of the reproduction clock signal by using the length of the longest pit, more concretely, the error between the length of the longest pit determined as a standard and the length of the longest pit actually detected is detected, and the frequency of the reproduction clock signal is controlled so as to reduce the error. Hereinafter, the length of the longest pit will be generally referred to as "TMAX" and the error between TMAX determined as a standard and TMAX actually detected will be referred to as a "TMAX error".

DISCLOSURE OF INVENTION

Problems to be Solved by the Invention

However, even with the conventional synchronization control, in the case where the frequency of the reproduction signal is much higher than that of the reproduction clock signal, a sample value obtained by digitizing the reproduction signal by using the reproduction clock signal at that time does not satisfy a so-called sampling theorem (specifically, a theorem that "in the case of digitizing an analog signal, the analog signal cannot be digitized to a correct value if it is not sampled at a sampling frequency which is twice or higher than the frequency of the analog signal"). As a result, the reproduction signal cannot be converted to a correct digital value, the correct length of the longest pit cannot be detected and, therefore, a problem occurs such that accurate synchronization control cannot be performed.

The problem will be concretely described with reference to FIGS. 1A and 1B and FIGS. 2A and 2B. FIGS. 1A and 1B and FIGS. 2A and 2B are timing charts concretely illustrating the problems.

First, the problem related to detection of the length of the longest pit will be described by using FIGS. 1A and 1B with respect to the case, as an example, where the length of the longest pit in the standard to which a process of recording AV information to an optical disk is applied is 5T and the length of the shortest recording pit in the standard (hereinafter, the shortest recording pit will be properly referred to as a shortest pit) is 2T. "T" denotes a length as a basic unit of the pit length in the standard (or the cycle of a reproduction clock signal corresponding to the length) (the definition will be similarly employed below). FIG. 1A shows the time relation between a reproduction clock signal (shown as "VCO_CLK" in FIGS. 1A and 1B and FIGS. 2A and 2B) and a sample value series of a reproduction signal (shown as "RF" in FIGS. 1A and 1B and FIGS. 2A and 2B) in a state where the frequency of the reproduction signal and the frequency of the reproduction clock signal are almost the same and synchronized by a PLL circuit. FIG. 1B shows the relation between the reproduction clock signal and the sample value series of the reproduction signal in a state where the frequency of the reproduction signal is twice as high as that of the reproduction clock signal and is not synchronized by the PLL circuit. FIGS. 1A and 1B and FIGS. 2A and 2B show the case, as an example, where a sample value series as digital signals is obtained from the reproduction signal by so-called "bit-by-bit decoding method" in which the decoded digital value changes between "0" and "1" at a timing when the waveform of the reproduction signal crosses zero, that is, a digital value of "0" or "1" is determined by the sign of a sample value as a reproduction signal.

In a state where the synchronization is established by the PLL circuit, as shown in FIG. 1A, the length of a recording pit included in a reproduction signal is accurately digitized and decoded with a reproduction clock signal synchronized with the reproduction signal.

However, in the case where the frequency of the reproduction signal is twice as high as that of the reproduction clock signal and the synchronization is not established by the PLL circuit as shown in FIG. 1B, due to dropout of a part of a sample value in the reproduction signal depending on a sampling timing (see broken-line circles in the highest row in FIG. 1B), the case occurs such that a sample value series which is expected to have a repetitive pattern of a length of 2T becomes almost "zero" (that is, the series of sample values detected from the reproduction signals are concentrated around zero-crossing) (see a broken-line oval in the second row in FIG. 1B).

Generally, in an optical disk such as the DVD, the case occurs such that the whole waveform of a reproduction signal fluctuates in the vertical direction due to the influence of runout or the like when the optical disk rotates. Consequently, when a reproduction signal is digitized by the bit-by-bit decoding method in the case of FIG. 1B, a sample value series to be detected as a repetitive pattern of a length of 2T in FIG. 1A is mixed with sample value series detected before and after the sample value series, and a recording pit having a length longer than the length of the longest pit in the standard ("5T" in FIGS. 1A and 1B) (that is, the length which cannot be detected in the standard) is determined and detected as the longest pit. As a result, the difference between the frequency of the reproduction signal and the frequency of the reproduction clock signal further increases, and the synchronization control becomes more difficult.

More concretely, in the case of FIG. 1B, although the length of the longest pit in the standard is "5T", the length of the longest pit detected by the bit-by-bit decoding method becomes "6T", so that the value of the TMAX error is "−1 (=5−6)". In this case, the TMAX error acts in the direction of reducing the control voltage of a voltage controlled oscillator in the PLL circuit, so that the oscillation frequency of the voltage-controlled oscillator becomes lower and the difference between the frequency of the reproduction signal and the frequency of the reproduction clock signal further increases. As a result, the synchronization control using the TMAX error becomes impossible.

Next, the problem related to detection of the length of the longest pit will be described by using FIGS. 2A and 2B with respect to the case, as an example, where the length of the longest pit in the standard is 5T and the length of the shortest pit is 2T in a manner similar to the case of FIGS. 1A and 1B and Viterbi decoding method as one of the maximum likelihood decoding methods is also used as a decoding (binarizing) method while comparing with the case where bit-by-bit decoding method is used as a binarizing method.

In the case where the frequency of the reproduction signal is much higher than that of the reproduction clock signal, even when the Viterbi decoding method is used as the binarizing method, there is a case that an erroneous TMAX error is detected. Specifically, as shown in FIG. 2A, in a state where synchronization is established by the PLL circuit, by using the Viterbi decoding method as the binarizing method or the bit-by-bit decoding method similar to that in the case of FIGS. 1A and 1B, the length of a recording pit included in a reproduction signal is accurately digitized and decoded with the reproduction clock signal synchronized with the reproduction signal. In FIGS. 2A and 2B, so-called run length limitation in the Viterbi decoding method is set as the longest pit length=5T and the shortest pit length=2T.

On the other hand, as shown in FIG. 2B, if the sample value series is binarized by the bit-by-bit decoding method when a part of sample values in the reproduction signal drops in a manner similar to the case of FIG. 1B (see broken-line circles in the highest row in FIG. 2B) in a state where the frequency of the reproduction signal is twice as high as that of the reproduction clock signal and synchronization is not obtained by the PLL circuit, a recording pit having a length of "1T" is detected and, further, the longest pit length in the interval is "3T".

On the other hand, in the Viterbi decoding method, the reproduction signal is binarized by using the run length limitation. Also in the case where "1T" is detected as the length of a recording pit if the signal is decoded by the bit-by-bit decoding method, the length of the recording pit may be detected as "2T" or the recording pit may be mixed with long recording pits detected before and after the recording pit to be binarized. A broken-line oval in the second lowest row in FIG. 2B indicates the latter case. Thus, the TMAX in the case of binarizing a signal by the Viterbi decoding method becomes "6T" (see FIG. 2B).

In the case shown in FIGS. 2A and 2B, the value of TMAX in the case of using the bit-by-bit decoding method as the decoding method is "3T", so that a TMAX error is "+2 (=5−3)". In this case, since the TMAX error acts in the direction of increasing the control voltage of the voltage controlled oscillator in the PLL circuit, the oscillation frequency of the voltage-controlled oscillator becomes higher, and the difference between the frequency of the reproduction signal and the frequency of the reproduction clock signal decreases.

In the case of FIG. 4 actually using the Viterbi decoding method as the decoding method, TMAX to be detected is "6T", so that the value of the TMAX error becomes "−1 (=5−6)". In this case, the TMAX error acts in the direction of decreasing the control voltage. As a result, the oscillation frequency of the voltage-controlled oscillator becomes high, and the difference between the frequency of the reproduction signal and the frequency of the reproduction clock signal increases.

The present invention has been achieved in view of the above-described problems. An object of the invention is to provide an information reproducing apparatus and an information reproducing method capable of preventing occurrence of erroneous detection as if a recording pit longer than the longest pit in the standard exists on an optical disk even in the case where the difference between frequency of a reproduction signal and frequency of a reproduction clock signal becomes large, an information reproducing program used for the information reproducing process, and an information recording medium on which the information reproducing program is recorded.

Means for Solving the Problems

In order to solve the above problems, the invention relates to an information reproducing apparatus for decoding and reproducing information recorded on a recording medium by using a detection signal detected from the recording medium while compensating the difference between frequency of the detection signal and frequency of a reproduction reference signal as a reference used at the time of reproducing the information by using the detection signal, comprising:

detecting means for detecting the difference; and level control means, when the detected difference is equal to or larger than a preset frequency difference, for performing a level control process for compensation on the detection signal, the process increasing level of the detection signal corresponding to a frequency band equal to or higher than a preset threshold frequency to be higher than level of the detection signal corresponding to the frequency band when the difference is less than the frequency difference, and for outputting the resultant signal to the detecting means.

In order to solve the above problems, the invention relates to an information reproducing method for decoding and reproducing information recorded on a recording medium by using a detection signal detected from the recording medium while compensating the difference between frequency of the detection signal and frequency of a reproduction reference signal as a reference used at the time of reproducing the information by using the detection signal, comprising:

a detecting step for detecting the difference by detecting means; and a level control step, when the detected difference is equal to or larger than a preset frequency difference, for performing a level control process for compensation on the detection signal, the process increasing level of the detection signal corresponding to a frequency band equal to or higher than a preset threshold frequency to be higher than level of the detection signal corresponding to the frequency band when the difference is less than the frequency difference, and outputting the resultant signal to the detecting means.

In order to solve the above problems, the invention relates to an information reproducing program for making a computer included in an information reproducing apparatus for decoding and reproducing information recorded on a recording medium by using a detection signal detected from the recording medium while compensating the difference between frequency of the detection signal and frequency of a reproduction reference signal as a reference used at the time of reproducing the information by using the detection signal, function as:

detecting means for detecting the difference; and level control means, when the detected difference is equal to or larger than a preset frequency difference, for performing a level control process for compensation on the detection signal, the process increasing level of the detection signal corresponding to a frequency band equal to or higher than a preset threshold frequency to be higher than level of the detection signal corresponding to the frequency band when the difference is less than the frequency difference, and for outputting the resultant signal to the detecting means.

In order to solve the above problems, the invention relates to an information recording medium where the information reproducing program is recorded so that it can be read by the computer.

BRIEF DESCRIPTION OF DRAWINGS

FIG. 1A is a timing chart showing the case where the frequency of a detection signal and that of a reproduction clock signal substantially coincide with each other, and FIG. 1B is a timing chart showing the case where the frequencies do not coincide with each other.

FIGS. 2A and 2B are timing charts (II) showing a problem of the invention. FIG. 2A is a timing chart showing the case where the frequency of the detection signal and that of the reproduction clock signal almost coincide with each other, and FIG. 2B is a timing chart showing the case where the frequencies do not coincide with each other.

FIG. 6A is a graph showing the frequency characteristics in normal times, and FIG. 6B is a graph showing the frequency characteristics applied in the case where the frequency of a detection signal and that of a reproduction clock signal do not coincide with each other.

FIG. 9A is a block diagram showing the configuration of the equalizer, and FIG. 9B is a graph showing the frequency characteristics applied in the case where the frequency of a detection signal and that of a reproduction clock signal do not coincide with each other.

Figure 1A:
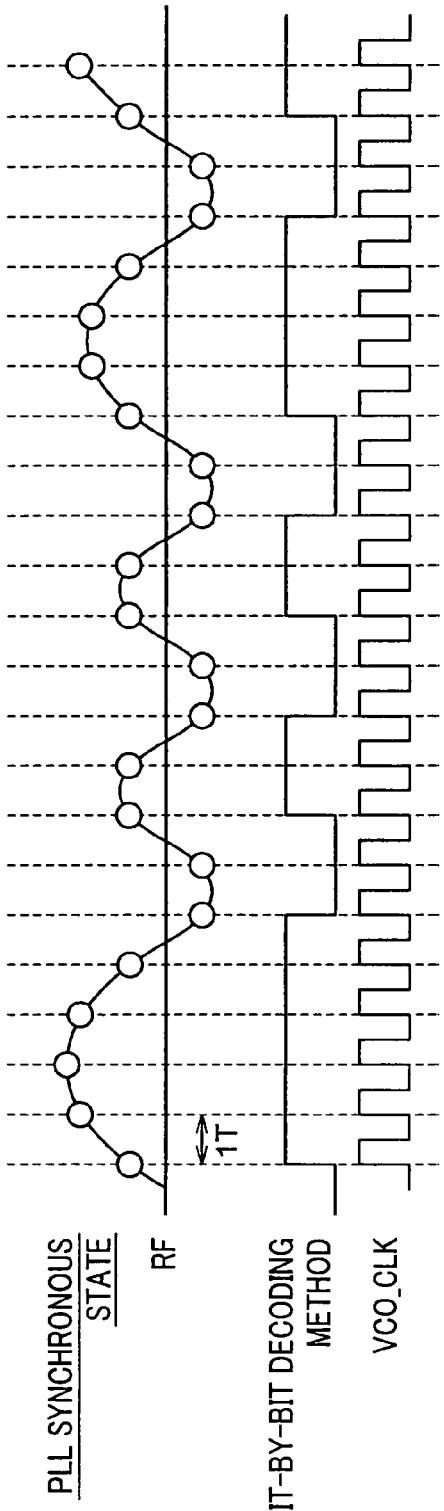
FIGS. 1A and 1B are timing charts (I) showing a problem of the present invention.

DESCRIPTION OF REFERENCE NUMERALS 2, 2A, 2B equalizers
3, 3A, 3B memories
4, 4A switches
5 binarizing unit
5A bit-by-bit decoder
5B Viterbi decoder
6 TMAX error detector
7 determining unit
9 adder
10 VCO
12 reproduction clock signal generator 30, 31, 32, 40, 41 flip-flop circuits
33, 34, 35, 36, 42, 43, 44 multipliers
37, 45 adders
50 analog equalizer
55 frequency error switch determining unit
56 sync signal interval error detector
P1, P2, P3, P4, P5 information reproducing apparatuses

BEST MODE FOR CARRYING OUT THE INVENTION

Best modes for carrying out the present invention will now be described with reference to the drawings. The following embodiments relate to the case where the present invention is applied to a process of generating a reproduction clock signal in an information reproducing apparatus for optically reproducing AV information from an optical disc such as a DVD on which the AV information or the like is recorded.

(I) Principle of the Present Invention

First, prior to detailed description of embodiments of the invention, the principle of the present invention will be described.

Figure 1B:
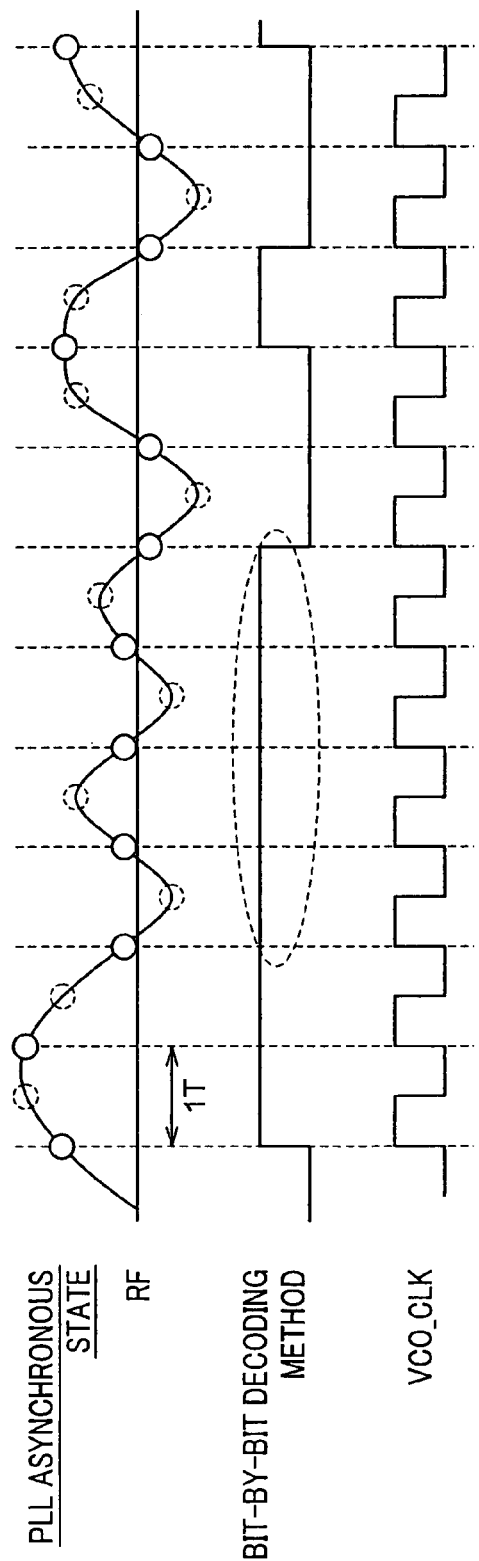

In the application of the invention, when the difference between the frequency of a reproduction signal detected from an optical disc and the frequency of the reproduction clock signal becomes large and a PLL circuit shown in FIG. 1B or 2B enters an asynchronous state, a process of increasing (emphasizing) the level (amplitude) of a reproduction signal in a frequency band equal to or higher than a preset threshold frequency to be higher than the level (amplitude) of a reproduction signal of a frequency lower than the threshold frequency. The processed reproduction signal is provided for detecting a TMAX error. The threshold frequency is set so that, for example, the level (amplitude) of a reproduction signal corresponding to recording pits in the range of the lengths from 2T to 4T becomes higher than that of a reproduction signal corresponding to a recording pit having a length of 5T or longer.

With the arrangement, in the case where samples having values around the zero level of a reproduction signal (RF) continue as shown in FIG. 1B or 2B, even when the entire waveform of a reproduction periodically fluctuates in the vertical direction due to the influence of runout when an optical disc rotates, by emphasizing the level (amplitude) of a reproduction signal corresponding to a recording pit having a short length (for example, the length in the range from 2T to 4T), the samples having the values around the zero level cross the zero level periodically (that is, zero cross occurs) periodically (that is, irrespective of the cycles of the runout or the like). Therefore, the above-described "determination and detection of a recording pit longer than the longest pit in the standard as the longest pit" can be prevented. Even in the case where the difference between the frequency of a reproduction signal and that of a reproduction clock signal is large, a TMAX error is not erroneously detected. Thus, the control of the frequency of the reproduction clock signal can be accurately continued.

Embodiments of the present invention based on the principle will now be described concretely.

(II) First Embodiment

A first embodiment according to the present invention based on the principle will be described with reference to FIGS. 3 to 7.

Figure 3:
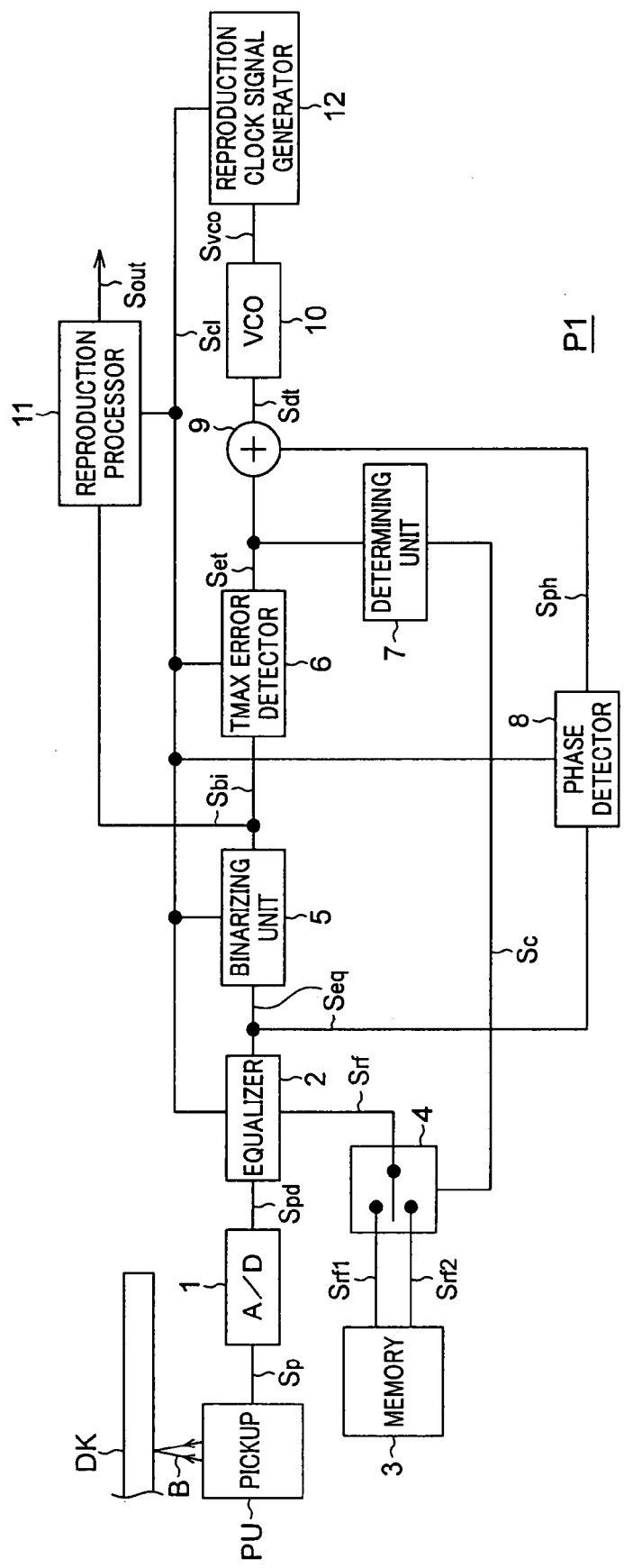
FIG. 3 is a block diagram showing a schematic configuration of an information reproducing apparatus according to a first embodiment.
Figure 4:
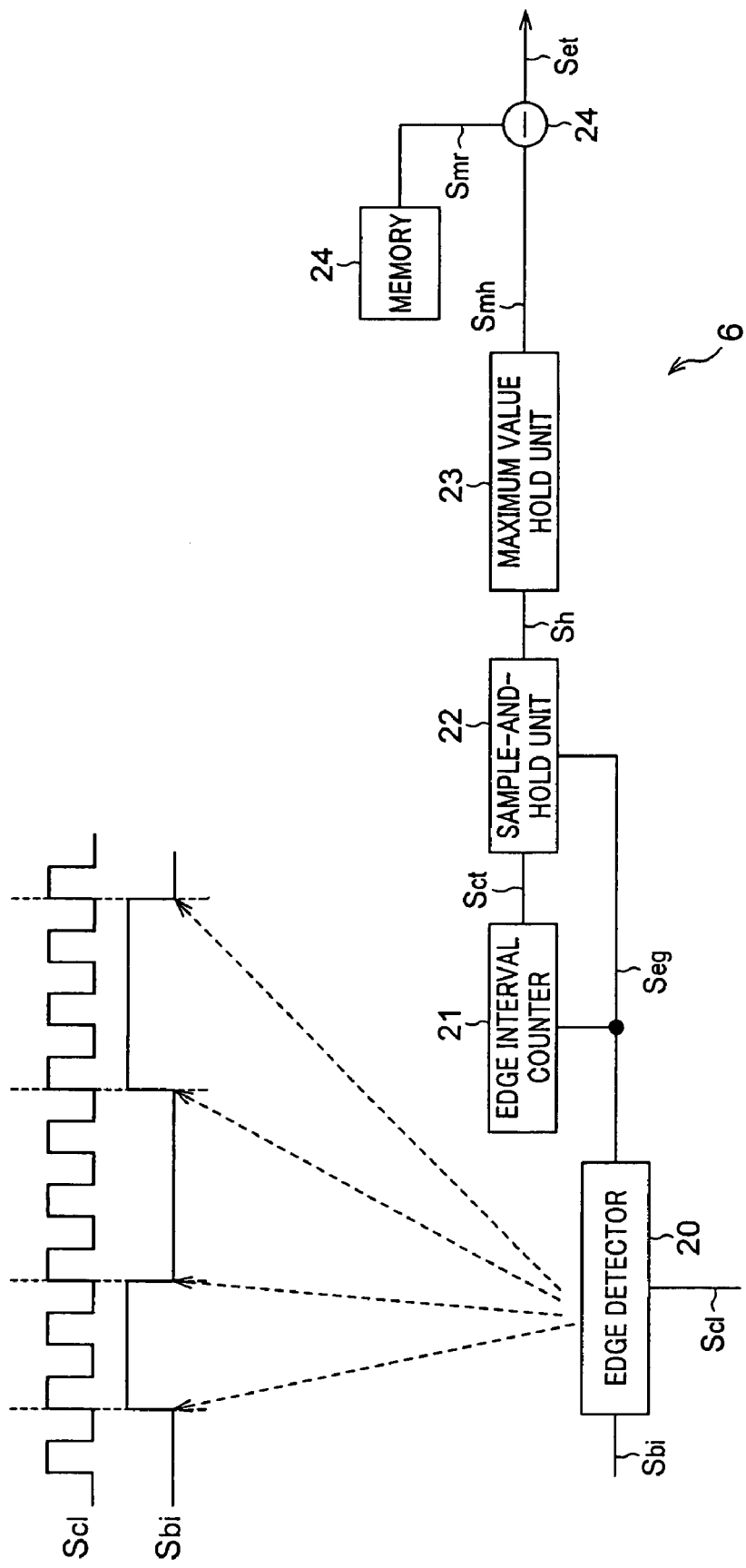
FIG. 4 is a block diagram showing the configuration of a TMAX error detector according to the first embodiment.
Figure 5:
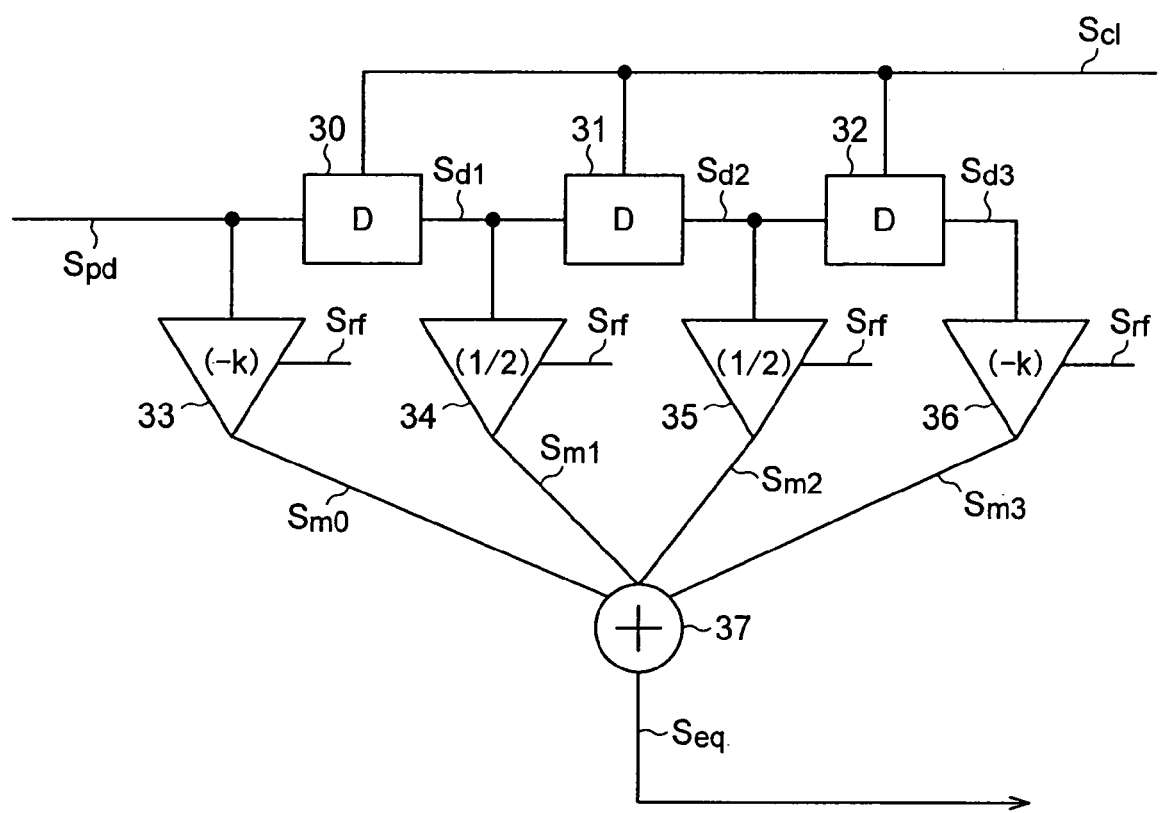
FIG. 5 is a block diagram showing the configuration of an equalizer according to the first embodiment.
Figure 6A:
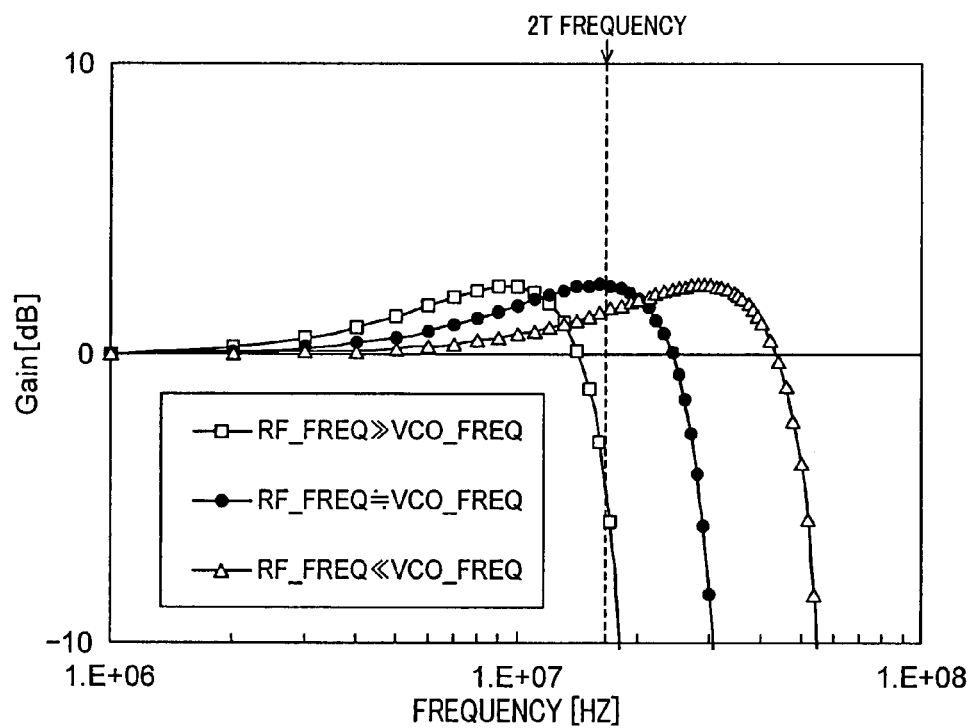
FIGS. 6A and 6B are graphs showing the frequency characteristics in the equalizer according to the first embodiment.
Figure 6B:
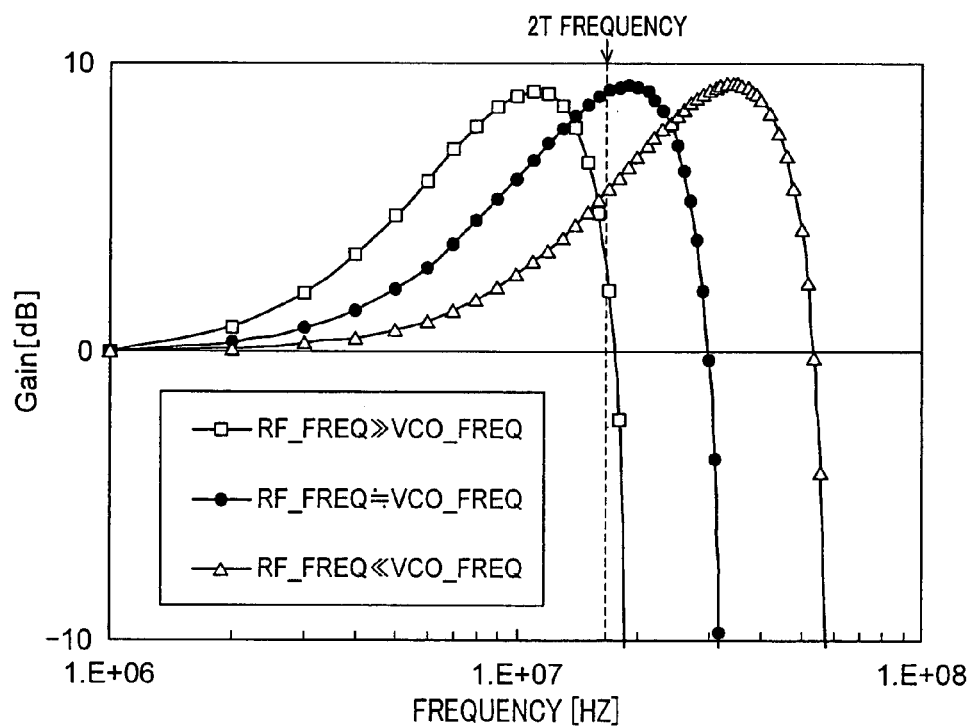
Figure 7:
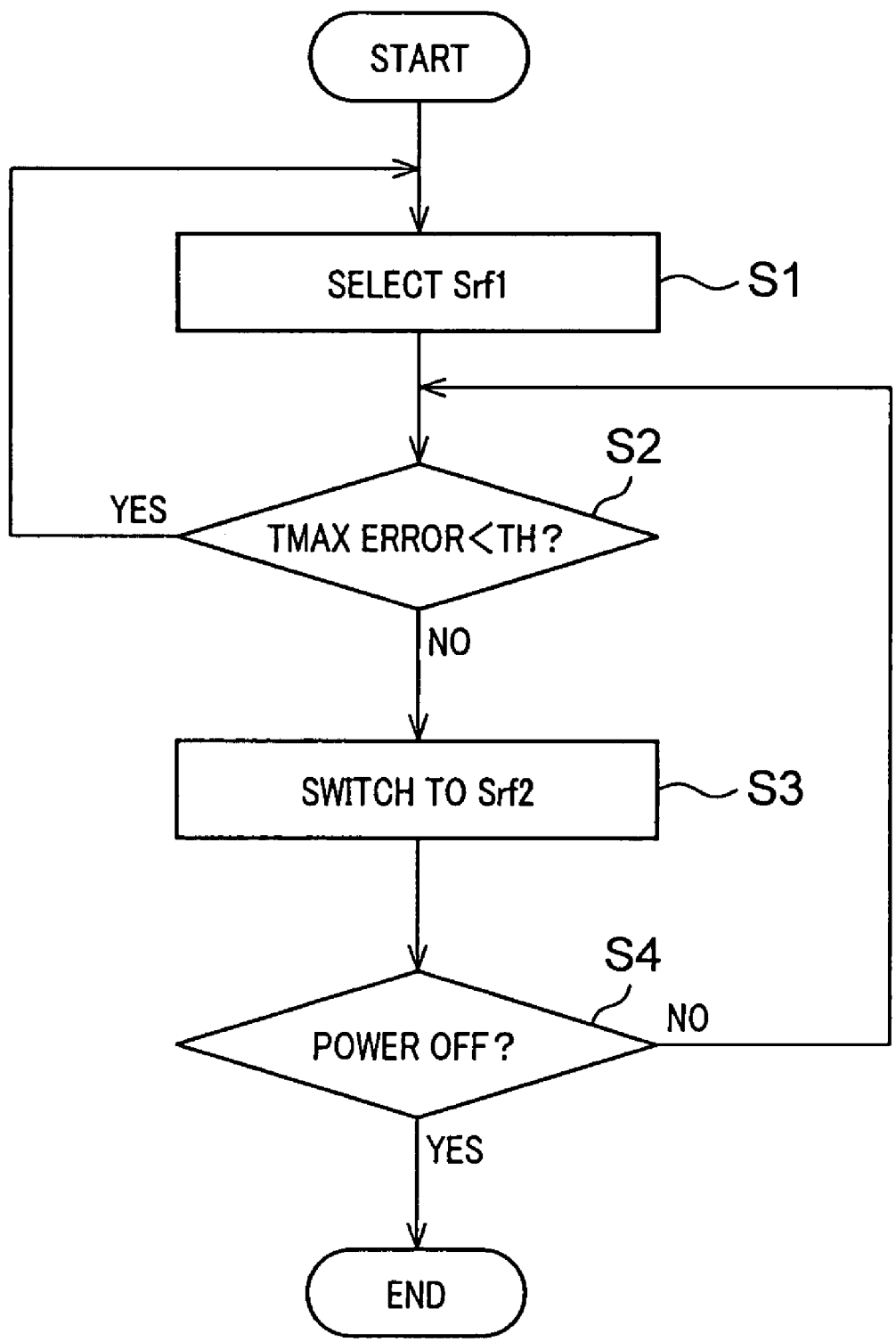
FIG. 7 is a flowchart showing processes in a determining unit according to the first embodiment.

The FIG. 3 is a block diagram showing a schematic configuration of an information reproducing apparatus according to the first embodiment, FIGS. 4 to 6 are block diagrams each showing the detailed configuration of the information reproducing apparatus, and FIG. 7 is a flowchart showing the operation of the information reproducing apparatus.

As shown in FIG. 1, an information reproducing apparatus P1 according to the first embodiment has a pickup PU, an A/D (Analog/Digital) converter 1, an equalizer 2 of the invention, a memory 3, a switch 4, a determining unit 7 as control means, a binarizing unit 5, a TMAX error detector 6 as detecting means, a phase detector 8, an adder 9, a VCO (Voltage Controlled Oscillator) 10, a reproduction processor 11, and a reproduction clock signal generator 12.

As shown in FIG. 4, the TMAX error detector 6 has an edge detector 20, an edge interval counter 21, a sample-and-hold unit 22, a maximum value hold unit 23, a subtracter 24, and a memory 24.

Further, as shown in FIG. 5, the equalizer 2 includes flip-flop circuits 30 to 32 as delay elements, multipliers 33 to 36, and an adder 37.

FIG. 3 shows only a part related to the invention in the information reproducing apparatus P1 according to the first embodiment. The actual information reproducing apparatus P1 includes, in addition to the members shown in FIG. 3, a spindle motor for rotating an optical disk DK, a rotation servo circuit for controlling rotation of the spindle motor, a servo circuit for controlling the converging position of an optical beam B which will be described later in the radial direction and the perpendicular direction of the optical disk DK, an operating unit operated by the user for designating the operation of the information reproducing apparatus P1, a display unit for displaying an operation state of the information reproducing apparatus P1, and a control unit for controlling the operations of the entire information reproducing apparatus P1 in an integrated manner.

The operation will now be described.

First, the pickup PU irradiates the optical disk DK rotating at a preset rotational speed with the optical beam B for reproduction. The pickup PU receives reflection light from the optical disk DK of the optical beam B, generates a detection signal Sp as an analog signal corresponding to the intensity of the received reflection light, and outputs the detection signal Sp to the A/D converter 1.

The A/D converter 1 converts the detection signal Sp to a digital detection signal Spd, and outputs the digital detection signal Spd to the equalizer 2.

On the basis of a reproduction clock signal Scl which will be described later and a reference signal Srf output from the switch 4, the equalizer 2 changes the frequency characteristic (more concretely, the amplitude at each frequency) of the digital detection signal Spd so as to be the frequency characteristic indicated by the reference signal Srf (that is, performs waveform equalizing process). The equalizer 2 outputs the resultant signal as an equalizer signal Seq to the phase detector 8 and the binarizing unit 5.

As shown in FIG. 5, in the equalizer 2, the digital detection signal Spd is output to the flip-flop circuit 30 and the multiplier 33. The flip-flop circuit 30 delays the digital detection signal Spd only by 1T minutes on the basis of the input reproduction clock signal Scl, and outputs the resultant signal as a delay signal Sd1 to the flip-flop circuit 31 and to the multiplier 34. The flip-flop circuit 31 further delays the delay signal Sd1 only by 1T minutes on the basis of the reproduction clock signal Scl, and outputs the resultant signal as a delay signal Sd2 to the flip-flop circuit 32 and to the multiplier 35. The flip-flop circuit 32 further delays the delay signal Sd1 only by 1T minutes on the basis of the reproduction clock signal Scl, and outputs the resultant signal as a delay signal Sd3 to the multiplier 36.

On the other hand, the multiplier 33 multiplies the digital detection signal Spd with a tap coefficient controlled on the basis of the reference signal Srf using a preset tap coefficient for the multiplier 33 ("−k" in the case of the multiplier 33 as shown in FIG. 5) as a reference, thereby generating a multiplied signal Sm0, and outputs the multiplied signal Sm0 to the adder 37. The multiplier 34 multiplies the delay signal Sd1 with a tap coefficient controlled on the basis of the reference signal Srf using a preset tap coefficient for the multiplier 34 ("½" in the case of the multiplier 34) as a reference, thereby generating a multiplied signal Sm1, and outputs the multiplied signal Sm1 to the adder 37. The multiplier 35 multiplies the delay signal Sd2 with a tap coefficient controlled on the basis of the reference signal Srf using a preset tap coefficient for the multiplier 34 ("½" also in the case of the multiplier 35) as a reference, thereby generating a multiplied signal Sm2, and outputs the multiplied signal Sm2 to the adder 37. Finally, the multiplier 36 multiplies the delay signal Sd3 with a tap coefficient controlled on the basis of the reference signal Srf using a preset tap coefficient for the multiplier 35 ("½" also in the case of the multiplier 35) as a reference, thereby generating a multiplied signal Sm3, and outputs the multiplied signal Sm3 to the adder 37.

The adder 37 adds all of the multiplied signals Sm0 to Sm3 and outputs the result signal as the equalizer signal Seq to the binarizing unit 5 ad the phase detector 8.

Therefore, for example, the transfer function in the equalizer 2 having the configuration shown in FIG. 5 is expressed as follows.

Transfer function=−2×$k$×cos(1.5ω$T$)+cos(0.5ω$T$)

wherein T=1/fs (fs denotes the frequency of the reproduction clock signal Scl) and ω$T$=2×π×(f/fs))

Next, the switch 4 switches either a first reference signal Srf1 or a second reference signal Srf2 output from the memory 3 on the basis of a control signal Sc from the determining unit 7, and outputs the switched signal as the reference signal Srf to the equalizer 2. The first and second reference signals Srf1 and Srf2 will be described in detail later.

On the other hand, the phase detector 8 detects a phase error included in the equalizer signal Seq by repeating extraction of a sample having a value closest to the zero level from a sample value series included in the equalizer signal Seq, generates a phase error signal Sph indicative of the detected phase error, and outputs it to the adder 9.

On the other hand, the binarizing unit 5 performs binarization by comparing the value of the equalizer signal Seq with the zero level to determine 0 or 1 as the value of the equalizer signal Seq, thereby generating a binary signal Sbi, and outputs the binary signal Sbi to the TMAX error detector 6 and the reproduction processor 11.

The TMAX error detector 6 detects the TMAX error on the basis of the binary signal Sbi and the reproduction clock signal Scl generated from the reproduction clock signal generator 12, generates an error signal Set indicative of the detected TMAX error, and outputs it to the determining unit 7 and the adder 9.

As shown in FIG. 4, in the TMAX error detector 6, first, the binary signal Sbi and the reproduction clock signal Scl are input to the edge detector 20.

The edge detector 20 generates an edge signal Seg at the timing of each edge in the binary signal Sbi using the reproduction clock signal Scl as a reference (that is, each of the timing when the value of the binary signal Sbi changes from "0" to "1" and the timing when the value changes from "1" to "0"), and outputs the edge signal Seg to the edge interval counter 21 and the sample-and-hold unit 22.

The edge interval counter 21 detects time from the timing when the value of the binary signal Sbi changes from "0" to "1" to the timing when the value changes again from "1" to "0" in the edge signal Seg as the unit of "T", and outputs the time as an interval signal Sct to the sample-and-hold unit 22.

While making a reset at the timing the edge signal Seg is output, the sample-and-hold unit 22 stores the interval indicated by the interval signal Sct, and outputs the signal to the maximum value hold unit 23 at a preset timing.

The maximum value hold unit 23 detects TMAX in a predetermined period, generates a TMAX signal Smh indicative of the value, and outputs it to the subtracter 24.

More concretely, a recording pit (sync recording pit) having a length of 9T as TMAX in the Blu-ray standard which is being actively developed in recent years appears every 1932 channel clocks (reference clock). By setting the predetermined period to 4000 channel clocks, for example, even when the frequency of the detection signal Sp is the half of the reproduction clock signal Scl or less, the longest pit can be detected as the sync recording pit in each of the predetermined periods. More generally, the predetermined period can be determined in consideration with the rotation speed difference between the innermost radius side and the outermost radius side of the optical disk DK.

Next, to the subtracter 24, the reference signal Smr indicative of the value of TMAX, which is standardized in advance in the standard to which the optical disk DK corresponds, is output from the memory 24 in which the value is pre-stored.

Consequently, the subtracter 24 compares the value of TMAX in the standard indicated by the reference signal Smr (specifically, the value of TMAX in the case where the frequency of the detection signal Sp (=the frequency of the binary signal Sbi) and the frequency of the reproduction clock signal Scl are the same) with the value indicated by the TMAX signal Smh output from the maximum value hold unit 23. The subtracter 24 generates the error signal Set indicative of the difference as the TMAX error, and outputs it to the determining unit 7 and the adder 9.

Next, the adder 9 adds the error signal Set and the phase error signal Sph, generates an addition signal Sdt indicative of the error between the frequency of the detection signal Sp and the reproduction clock signal Scl, and outputs the addition signal Sdt to the voltage controlled terminal of the VCO 10.

The VCO 10 generates a reference clock signal Svco having a frequency as a reference used at the time of setting the frequency of the reproduction clock signal Scl to set the value of the addition signal Sdt to zero (that is, to set the error between the frequency of the detection signal Sp and the reproduction clock signal Scl to zero), and outputs it to the reproduction clock signal generator 12.

The reproduction clock signal generator 12 generates the reproduction clock signal Scl having the frequency synchronized with the reference clock signal Svco (that is, the reproduction clock signal Scl synchronized with the detection signal Sp) and outputs it to the reproduction processor 11 and the TMAX error detector 6.

As described above, by using the signal obtained by adding the error signal Set and the phase error signal Sph as a voltage controlled signal of the VCO 10, in the case where the difference between the frequency of the detection signal Sp and that of the reproduction clock signal Scl is equal to or larger than a preset difference, the oscillation frequency of the VCO 10 is controlled by the TMAX error. On the other hand, when the difference is less than the preset difference, the VCO 10 is controlled to set the phase error indicated by the phase error signal Sph to zero.

The reproduction processor 11 performs a necessary decoding process and the like on the binary signal Sbi on the basis of the reproduction clock signal Scl to generate the reproduction signal Sout corresponding to the information recorded on the optical disk DK, and outputs the generated reproduction signal Sout to a not-shown external speaker, display, or the like.

On the other hand, the determining unit 7 determines an error between the frequencies of the detection signal Sp and that of the reproduction clock signal Scl on the basis of the error signal Set. In the case where the error is equal to or lager than a preset threshold, the determining unit 7 generates the control signal Sc for selecting the second reference signal Srf2 from the memory 3 and outputting it as the reference signal Srf to the equalizer 2, and outputs the control signal Sc to the switch 4. In the case where the error is less than the preset threshold, the determining unit 7 generates the control signal Sc for selecting the first reference signal Srf1 from the memory 3 and outputting it to the equalizer 2 and outputs the control signal Sc to the switch 4.

Next, the frequency characteristic of the equalizer 2 indicated by the first and second reference signals Srf1 and Srf2 pre-stored in the memory 3 will be described concretely with reference to FIGS. 6A and 6B.

FIG. 6A shows the frequency characteristic of the equalizer 2 indicated by the first reference signal Srf1, and FIG. 6B shows the frequency characteristic of the equalizer 2 indicated by the second reference signal Srf2. The frequency characteristics shown in FIGS. 6A and 6B are those of the equalizer 2 applied to the case where the shortest pit length is "2T". In FIGS. 6A and 6B, the frequency of the detection signal Sp is expressed as "RF_FREQ", and that of the reproduction clock signal Scl is expressed as "VCO_REF". Further, in FIGS. 6A and 6B, the frequency characteristic shown by solid circles (●) is that in the case where the frequency of the detection signal Sp and that of the reproduction clock signal Scl are synchronized. The frequency characteristic shown by blank triangles (Δ) is that in the case where the frequency of the detection signal Sp is 60% of that of the reproduction clock signal Scl. The frequency characteristic shown by blank squares (□) is that in the case where the frequency of the detection signal Sp is 140% of that of the reproduction clock signal Scl.

In the first embodiment, the first reference signal Srf1 is selected by the switch 4 in the case where the frequency of the detection signal Sp and that of the reproduction clock signal Scl are in a synchronized state or in a state close to the synchronized state, and is output as the reference signal Srf to set the frequency characteristic of the equalizer 2. As shown in FIG. 5, the delay element in the equalizer 2 is constructed by the flip-flop circuits 30 to 32. Generally, when the frequency of the reproduction clock signal Scl changes, the delay time among taps in the equalizer 2 also changes. Due to this, the frequency characteristic corresponding to the frequency of the reproduction clock signal Scl in the equalizer 2 also changes.

With the frequency characteristic shown by the first reference signal Srf1, to eliminate the noise component in the high frequency band, in the case where the frequency of the detection signal Sp and that of the reproduction clock signal Scl are almost synchronized with each other (see solid circles (●) in FIG. 6A), the equalizer 2 has the frequency characteristic that the amplitude of the detection signal Sp corresponding to a recording pit having a length of "2T" is emphasized and a high frequency component corresponding to a length less than "2T" is reduced steeply. On the other hand, in the case where the frequency of the detection signal Sp increases to 140% of the frequency of the reproduction clock signal Scl (see the blank squares (□) in FIG. 6A), even the frequency component of the detection signal Sp corresponding to the length "2T" is attenuated by the equalizer 2.

In the first embodiment, in the case where the difference occurs between the frequency of the detection signal Sp and that of the reproduction clock signal Scl to a degree that even the frequency component corresponding to the length "2T" is attenuated by the equalizer 2, the switch 4 is controlled by the control signal Sc so as to output, as the reference signal Srf, the second reference signal Srf2 indicative of the frequency characteristic shown in FIG. 6B in place of the first reference signal Srf1 to the equalizer 2. By setting the equalizer 3 so as to set the frequency characteristic as shown in FIG. 6B, the frequency component of the detection signal Sp corresponding to the length "2T" is not attenuated, and thus the information of the recording pit having the length "2T" can be prevented from being mixed with information corresponding to the adjacent recording pits. Therefore, erroneous detection of a TMAX error caused by the mixture can be also prevented.

Finally, the process of switching the first and second reference signals Srf1 and Srf2 executed in the determining unit 7 will be generally described with reference to FIG. 7.

As shown in FIG. 7, when the operation of the information reproducing apparatus P1 starts, the determining unit 7 generates the control signal Sc for switching the switch 4 to select the first reference signal Srf1 and output it to the equalizer 2 and outputs the control signal Sc to the switch 4 (step S1).

The value of the TMAX error indicated by the error signal Set is monitored in this state (step S2). When the value is less than the preset threshold TH (in the example of FIGS. 6A and 6B, threshold corresponding to the value of the TMAX error detected in the case where the frequency of the detection signal Sp becomes 140% of the reproduction clock signal Scl (YES in step S2), the control signal Sc is generated to continue the selection of the first reference signal Srf1. On the other hand, when the value of the TMAX error becomes equal to or higher than the threshold TH (NO in step S2), the determining unit 7 generates the control signal Sc for switching the switch 4 to select the second reference signal Srf2 in place of the first reference signal Srf1 and output it to the equalizer 2, and outputs it to the switch 4 (step S3).

After that, whether the power switch of the information reproducing apparatus P1 itself is turned off or not is monitored (step S4). When the power switch is off (YES in step S4), the reproduction control process according to the first embodiment is finished. On the other hand, when the power switch is not yet turned off (NO in step S4), the program returns to the step S2 and repeats the series of processes. By the process, even when the second reference signal Srf2 starts to be outputted as the reference signal Srf to the equalizer 2, if the value of the error signal Set becomes less than the threshold TH, the original first reference signal Srf1 is selected again and is output as the reference signal Srf to the equalizer 2.

As described above, by the operation of the information reproducing apparatus according to the first embodiment, when the difference between the frequency of the detection signal Sp and that of the reproduction clock signal Scl is equal to or higher than the preset threshold, the process of switching the frequency characteristic of increasing the amplitude of the detection signal Sp corresponding to the frequency band equal to or higher than the preset frequency is executed by the equalizer 2. Even in the case where the difference between the frequency of the detection signal Sp and the frequency of the reproduction clock signal Scl becomes large, occurrence of erroneous detection of a TMAX error can be prevented. Consequently, the difference between the frequency of the detection signal Sp and that of the reproduction clock signal Scl is accurately compensated, and AV information can be correctly detected.

As a result of the operation, when the difference between the frequency of the detection signal Sp and that of the reproduction clock signal Scl becomes less than the threshold (that is, when the difference is compensated), the frequency characteristic of the detection signal Sp is reset to the original normal frequency characteristic (see FIG. 6A). Consequently, after the difference between the frequency of the detection signal Sp and that of the reproduction clock signal Scl is compensated, by resetting the frequency characteristic to the normal frequency characteristic of the detection signal Sp, information can be reproduced more accurately.

Further, when the difference between the frequency of the digital detection signal Spd and that of the reproduction clock signal Scl is equal to or higher than the threshold, the process of switching the reference signal Srf according to the first embodiment is executed. Consequently, even in the case where the difference between the frequency of the detection signal Sp and that of the reproduction clock signal Scl becomes large, occurrence of error detection of a TMAX error can be prevented in the digital detection signal Spd. Thus, the difference between the frequency of the detection signal and the frequency of the reproduction clock signal is accurately compensated, and AV information can be accurately detected.

In the example shown in FIGS. 6A and 6B and FIG. 7, the process of switching the reference signal Srf is executed when the frequency of the detection signal Sp becomes about 140% of the reproduction clock signal Scl. The invention is not limited to the case. For example, the process of switching the reference signal Srf may be executed when the frequency of the detection signal Sp becomes about 110% of the reproduction clock signal Scl.

In this case, when the frequency difference between the detection signals Sp and the reproduction clock signal Scl is smaller, a process of compensating the difference (that is, the process of switching the reference signal Srf) is started. Consequently, the difference between the frequency of the detection signal Sp and the frequency of the reproduction clock signal Scl is compensated more effectively, and AV information can be detected accurately.

(III) Second Embodiment

A second embodiment as another embodiment according to the invention will now be described with reference to FIGS. 8 and 9.

Figure 8:
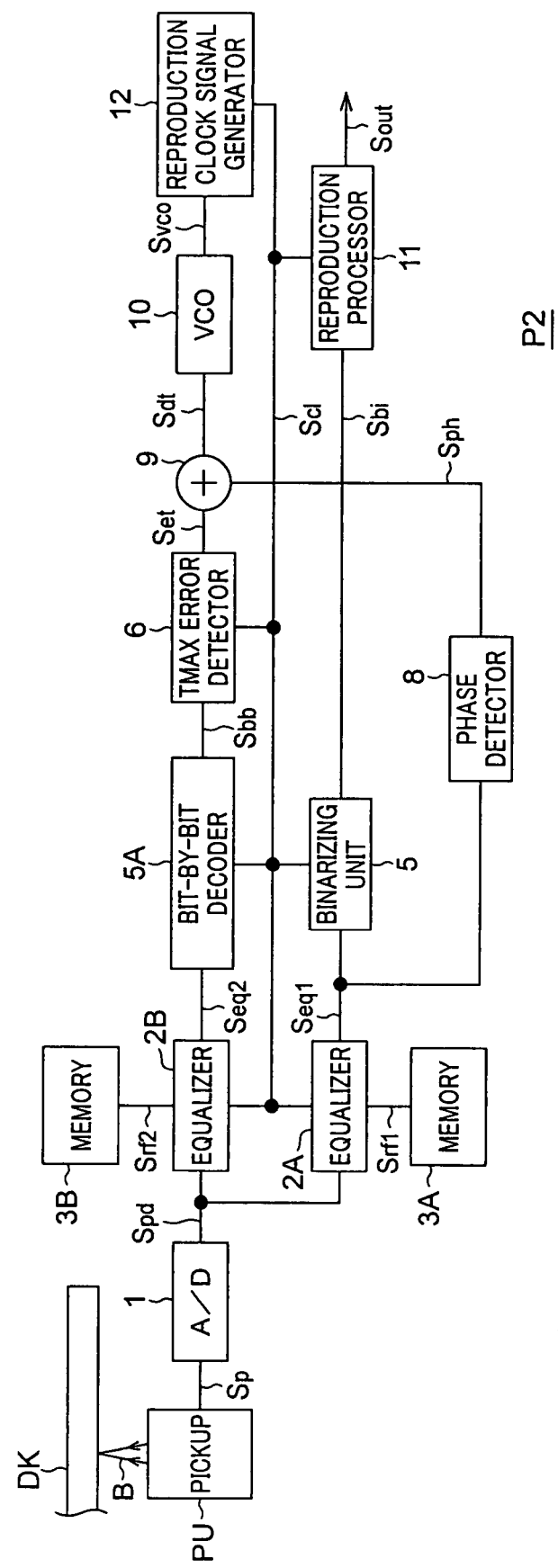
FIG. 8 is a block diagram showing a schematic configuration of an information reproducing apparatus according to a second embodiment.

FIG. 8 is a block diagram showing a schematic configuration of an information reproducing apparatus of the second embodiment. FIG. 9 is a diagram showing a detailed configuration of the information reproducing apparatus (equalizer 2B).

In the first embodiment, by switching the frequency characteristic of one equalizer 2 when the difference between the frequency of the detection signal Sp and the frequency of the reproduction clock signal Scl is large, erroneous detection of a TMAX error is prevented. The second embodiment described below relates to the case where an equalizer for detecting a TMAX error and an equalizer for reproducing AV information and the like are separately provided.

In FIGS. 8 and 9, similar reference numerals are designated to components similar to those of the information reproducing apparatus P1 according to the first embodiment, and their detailed description will not be repeated.

As shown in FIG. 8, an information reproducing apparatus P2 according to the second embodiment includes the pickup PU, the A/D converter 1, the binarizing unit 5, the TMAX error detector 6, the phase detector 8, the adder 9, the VCO 10, the reproduction processor 11, and the reproduction clock signal generator 12 having configurations and functions similar to those of the information reproducing apparatus P1 according to the first embodiment, an equalizer 2B, an equalizer 2A as level control means for decoding, memories 3A and 3B, and a bit-by-bit decoder 5A. The information reproducing apparatus P2 according to the second embodiment does not include the determining unit 7 as a component of the information reproducing apparatus P1 according to the first embodiment.

In the memory 3A, a reference signal similar to the first reference signal Srf1 for setting the frequency characteristic shown in FIG. 6A in the first embodiment is stored. The first reference signal Srf1 is output to the equalizer 2A.

On the other hand, the equalizer 2A is connected to the binarizing unit 5. The equalizer 2A changes the frequency characteristic of the digital detection signal Spd from the A/D converter 1 so as to become the frequency characteristic indicated by the first reference signal Srf1 on the basis of the reproduction clock signal Scl and the first reference signal Srf1 (that is, performs a waveform equalizing process) and outputs the resultant signal as a first equalizer signal Seq1 to the phase detector 8 and the binarizing unit 5. The phase detector 8 and the binarizing unit 5 execute operations similar to those in the first embodiment by using the first equalizer signal Seq1 to generate the phase error signal Sph and the binary signal Sbi, respectively, and output them to the adder 9 and the reproduction processor 11.

Figure 9A:
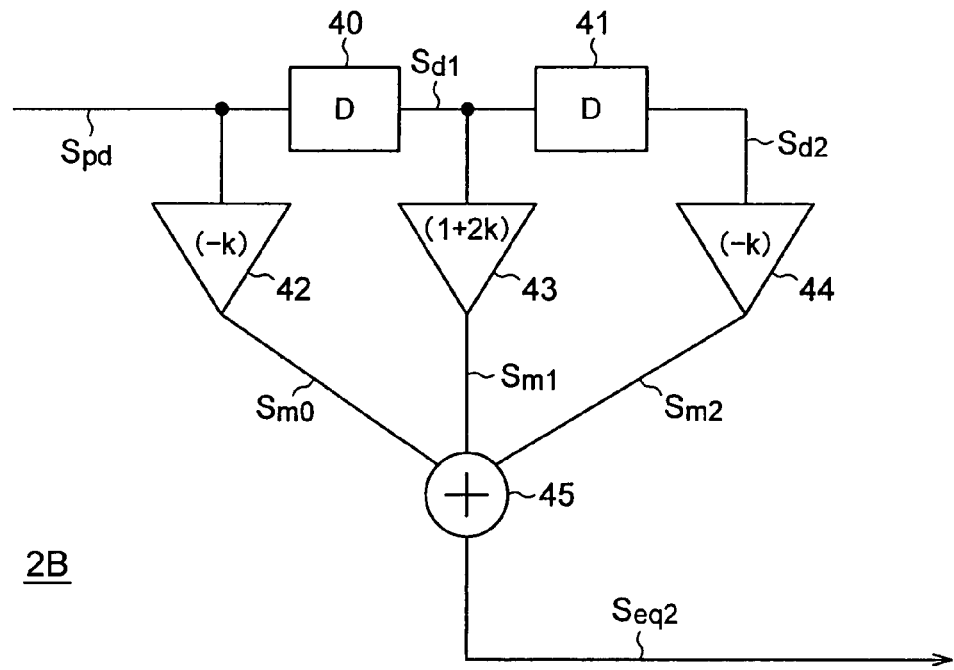
FIGS. 9A and 9B are diagrams showing an equalizer according to the second embodiment.

Different from the equalizer 2A, the equalizer 2B has flip-flop circuits 40 and 41, multipliers 42 to 44, and an adder 45 as shown in FIG. 9A, and is connected to the bit-by-bit decoder 5A. On the basis of the reproduction clock signal Scl and the second reference signal Srf2 output from the memory 3B, the equalizer 2B changes the frequency characteristic of the digital detection signal Spd so as to become the frequency characteristic indicated by the second reference signal Srf2 (that is, performs the waveform equalizing process), and outputs the resultant signal as a second equalizer signal Seq2 to the bit-by-bit decoder 5A.

As shown in FIG. 9A, in the equalizer 2B, the digital detection signal Spd is output to the flip-flop circuit 40 and the multiplier 42. The flip-flop circuit 40 delays the digital detection signal Spd only by 1T on the basis of the input reproduction clock signal Scl, and outputs the resultant signal as the delay signal Sd1 to the flip-flop circuit 41 and the multiplier 43. The flip-flop circuit 41 further delays the delay signal Sd1 only by 1T on the basis of the reproduction clock signal Scl, and outputs the resultant signal as a delay signal Sd2 to the multiplier 44.

The multiplier 42 multiplies the digital detection signal Spd with a tap coefficient controlled on the basis of the second reference signal Srf2 using, as a reference, a tap coefficient ("−k" in the case of the multiplier 42 as shown in FIG. 9A) which is preset for the multiplier 42, thereby generating the multiplied signal Sm0. The multiplier 42 outputs the multiplied signal Sm0 to the adder 45. Next, the multiplier 43 multiplies the delay signal Sd2 with a tap coefficient controlled on the basis of the second reference signal Srf2 using, as a reference, a tap coefficient ("1+2k" in the case of the multiplier 43) which is preset for the multiplier 43, thereby generating the multiplied signal Sm1. The multiplier 43 outputs the multiplied signal Sm1 to the adder 45. The multiplier 44 multiplies the delay signal Sd2 with a tap coefficient controlled on the basis of the second reference signal Srf2 using, as a reference, a tap coefficient ("–k" also in the case of the multiplier 44) which is preset for the multiplier 44, thereby generating the multiplied signal Sm2. The multiplier 44 outputs the multiplied signal Sm2 to the adder 45.

The adder 45 adds all of the multiplied signals Sm0 to Sm2 and outputs the resultant signal as the second equalizer signal Seq2 to the bit-by-bit decoder 5A.

Therefore, the transfer function in the equalizer 2B having the configuration shown in FIG. 9A is expressed as follows.

$$\text{Transfer function} = 1 + 2 \times k - 2 \times k \times \cos(\omega T)$$

wherein T=1/fs (fs denotes the frequency of the reproduction clock signal Scl) and $\omega T = 2 \times \pi \times (f/fs)$)

The bit-by-bit decoder 5A to which the second equalizer signal Seq2 is output from the equalizer 2B generates a decoded signal Sbb including a sample value series as a digital signal from the second equalizer signal Seq2 by using the bit-by-bit decoding method, and outputs it to the TMAX error detector 6.

The TMAX error detector 6 executes operations similar to those of the first embodiment by using the decoded signal Sbb to generate the error signal Set and outputs it to the adder 9.

Figure 9B:
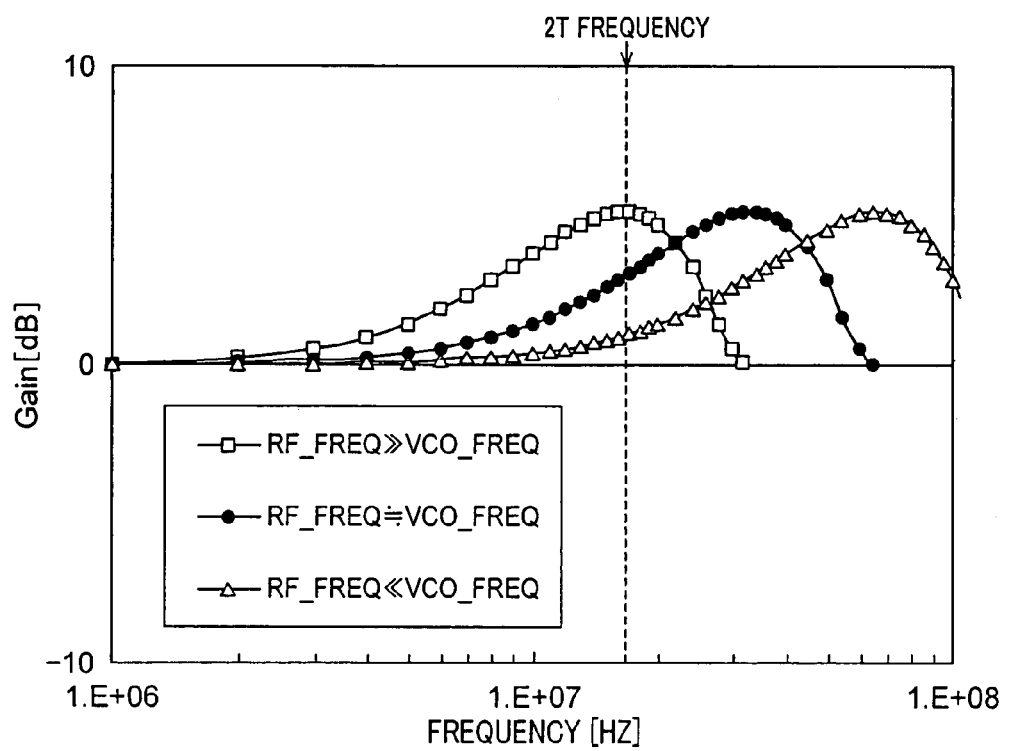

Next, the frequency characteristic of the equalizer 2B indicated by the second reference signal Srf2 prestored in the memory 3 will be concretely described with reference to FIG. 9B. FIG. 9B shows the frequency characteristic of the equalizer 2B indicated by the second reference signal Srf2 but does not show a high-frequency characteristic part. The frequency characteristic shown in FIG. 9B is that of the equalizer 2B applied to the case where the shortest pit length is "2T" in a manner similar to the case of the first embodiment. In FIG. 9B, the frequency of the detection signal Sp is expressed as "RF_FREQ", and that of the reproduction clock signal Scl is expressed as "VCO_REF". Further, in FIG. 9B, the frequency characteristic shown by solid circles (●) is that in the case where the frequency of the detection signal Sp and that of the reproduction clock signal Scl are synchronized. The frequency characteristic shown by blank triangles (Δ) is that in the case where the frequency of the detection signal Sp is 50% of that of the reproduction clock signal Scl. The frequency characteristic shown by blank squares (□) is that in the case where the frequency of the detection signal Sp is 150% of that of the reproduction clock signal Scl.

In the case of the second embodiment, the frequency characteristic of the equalize 2B is fixed to the frequency characteristic shown in FIG. 9B, and the frequency characteristic itself shown in FIG. 9B has a band sufficiently wider than that of the equalizer 2A. By using the equalizer 2B having such a characteristic only for detecting a TMAX error, the frequency component of the detection signal Sp corresponding to the length "2T" can be emphasized more than the other frequency components. Therefore, information of the recording pit having the length "2T" can be prevented from being mixed with information corresponding to adjacent recording pits. Therefore, also in the case where the frequency of the detection signal Sp becomes about twice as high as the frequency of the reproduction clock signal Scl, erroneous detection of the TMAX error caused by the mixture can be prevented.

As described above, in the operation of the information reproducing apparatus P2 according to the second embodiment, the equalizer 2A used for decoding AV information is also provided separately from the equalizer 2B for detecting a TMAX error. Consequently, by separately performing the process for compensating the difference between the frequency of the detection signal Sp and the frequency of the reproduction clock signal Scl (the compensating process for preventing erroneous detection of a TMAX error) and the decoding process for decoding AV information, occurrence of erroneous detection of a TMAX error can be prevented while satisfying both of the processes in a simpler manner. Thus, the difference between the frequency of the detection signal Sp and the frequency of the reproduction clock signal Scl is accurately compensated, and AV information can be detected accurately.

(IV) Third Embodiment

Figure 10:
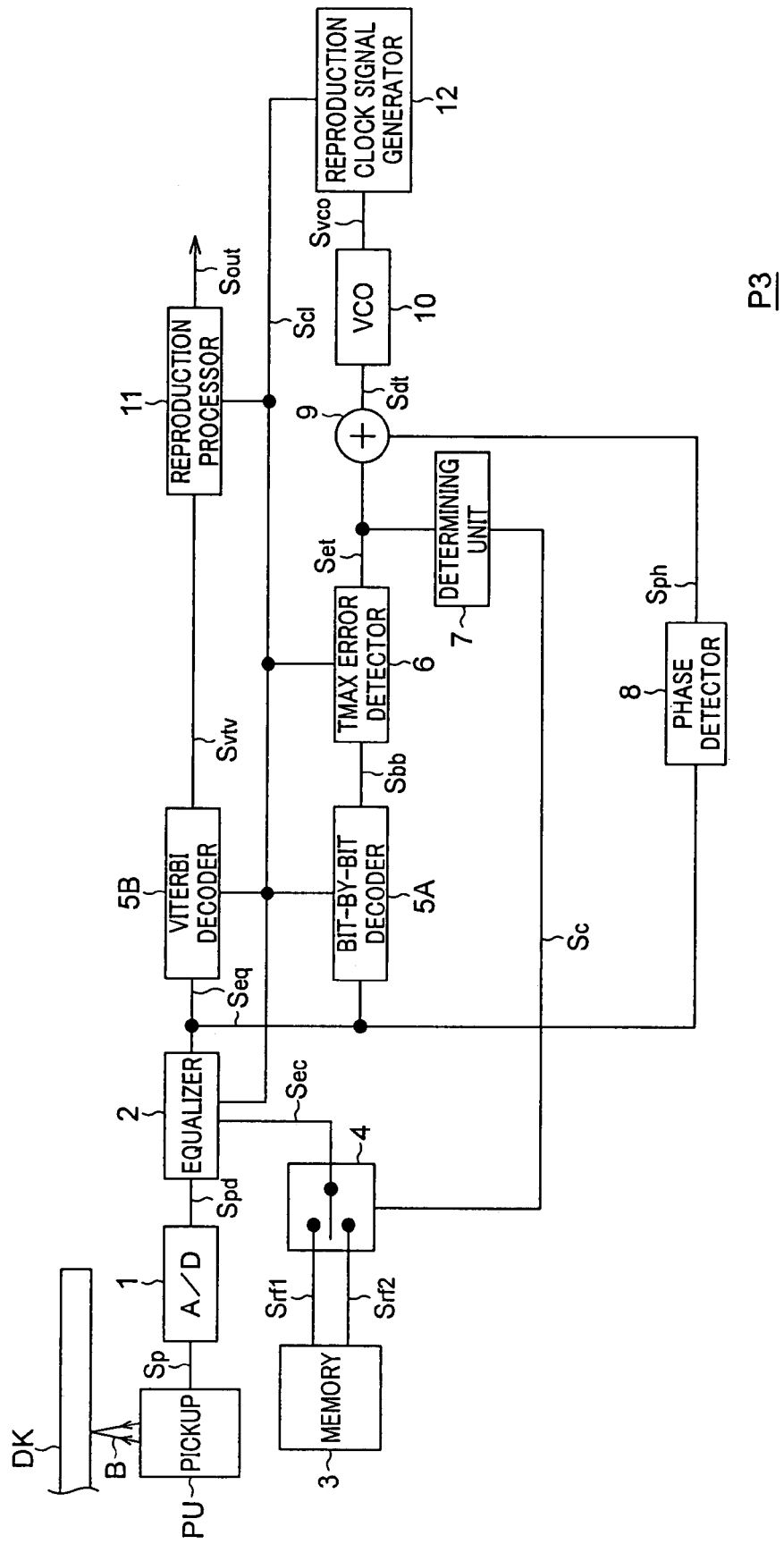
FIG. 10 is a block diagram showing a schematic configuration of an information reproducing apparatus according to a third embodiment.

A third embodiment as further another embodiment according to the invention will now be described with reference to FIG. 10. FIG. 10 is a block diagram showing a schematic configuration of an information reproducing apparatus according to the third embodiment.

In the first embodiment, erroneous detection of a TMAX error is prevented by switching the frequency characteristic of one equalizer 2 when the difference between the frequency of the detection signal Sp and the frequency of the reproduction clock signal Scl is large, and the binarizing unit 5 is commonly used for decoding AV information and for detecting a TMAX error. The third embodiment described below relates to the case where the Viterbi decoding method is used for the binarizing process for decoding, and the bit-by-bit decoding method is used for the binarizing process for detecting a TMAX error.

In FIG. 10, similar reference numerals are designated to components similar to those of the information reproducing apparatus P1 according to the first embodiment, and their detailed description will not be repeated.

As shown in FIG. 10, an information reproducing apparatus P3 according to the third embodiment includes the pickup PU, the A/D converter 1, the equalizer 2, the memory 3, the switch 4, the TMAX error detector 6, the determining unit 7, the phase detector 8, the adder 9, the VCO 10, the reproduction processor 11, and the reproduction clock signal generator 12 having configurations and functions similar to those of the information reproducing apparatus P1 according to the first embodiment, the bit-by-bit decoder 5A having a configuration and a function similar to those in the information reproducing apparatus P2 according to the second embodiment, and a Viterbi decoder 5B as reproducing means for decoding the equalizer signal Seq by the Viterbi decoding method using the reproduction clock signal Scl, thereby generating a decoded signal Svtv and outputting it to the reproduction processor 11.

In the configuration, the bit-by-bit decoder 5A generates the decoded signal Sbb dedicated to detect a TMAX error on the basis of the reproduction clock signal Scl and outputs it to the TMAX error detector 6.

On the other hand, the Viterbi decoder 5B decodes the equalizer signal Seq by the Viterbi decoding method to generate the decoded signal Svtv and outputs the decoded signal Svtv to the reproduction processor 11.

The reproduction processor 11 performs a necessary decoding process and the like on the decoded signal Svtv on the basis of the reproduction clock signal Scl, thereby generating a reproduced signal Sout corresponding to the information recorded on the optical disk DK, and outputs the reproduced signal Sout to a not-shown external speaker, display, or the like.

The other processes such as a process of switching the frequency characteristic of the equalizer 2 by the memory 3, the switch 4, the determining unit 7, and the like are executed in a manner similar to those of the information reproducing apparatus P1 according to the first embodiment.

By the operations of the information reproducing apparatus P3 according to the third embodiment described above, also in the case of using the Viterbi decoding method for decoding AV information, the problems described with reference to FIGS. 2A and 2B are solved and effects similar to those of the information reproducing apparatus P1 according to the first embodiment can be produced. In addition, since the Viterbi decoding method is used for decoding AV information, the difference between the frequency of the detection signal Sp and the frequency of the reproduction clock signal Scl can be accurately compensated and AV information can be reproduced accurately.

(V) Fourth Embodiment

Figure 11:
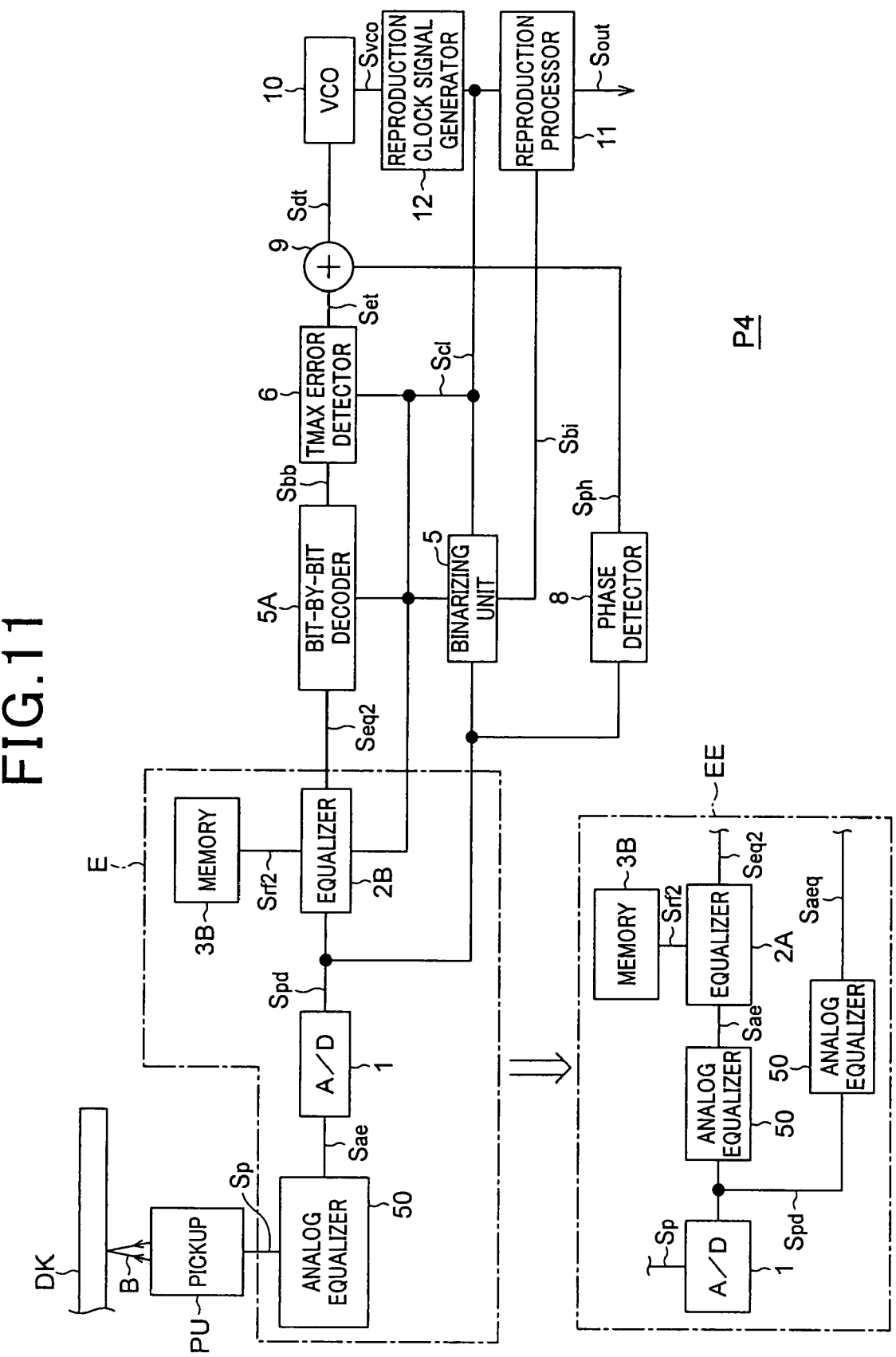
FIG. 11 is a block diagram showing a schematic configuration of an information reproducing apparatus according to a fourth embodiment.

A fourth embodiment as further another embodiment according to the invention will now be described with reference to FIG. 11. FIG. 11 is a block diagram showing a schematic configuration of an information reproducing apparatus according to the fourth embodiment.

In the second embodiment, the case where the equalizer for detecting a TMAX error and the equalizer for reproducing AV information and the like are separately provided in the configuration of the information reproducing apparatus P1 according to the first embodiment has been described. The following fourth embodiment relates to the case where an analog equalizer is also used in combination.

In FIG. 11, similar reference numerals are designated to components similar to those of the information reproducing apparatus P2 according to the second embodiment (see FIG. 8), and their detailed description will not be repeated.

As shown in FIG. 11, an information reproducing apparatus P4 according to the fourth embodiment includes the pickup PU, the A/D converter 1, the equalizer 2B, the memory 3B, the binarizing unit 5, the bit-by-bit decoder 5A, the TMAX error detector 6, the phase detector 8, the adder 9, the VCO 10, the reproduction processor 11, and the reproduction clock signal generator 12 having configurations and functions similar to those of the information reproducing apparatus P2 according to the second embodiment, and an analog equalizer 50. The information reproducing apparatus P4 according to the fourth embodiment does not include the equalizer 2A and the memory 3A as the components of the information reproducing apparatus P2 according to the second embodiment.

In the configuration, the analog equalizer 50 performs an analog waveform equalizing process on the frequency characteristic of the detection signal Sp output from the pickup PU and outputs the resultant signal as an analog equalizer signal Sae to the A/D converter 1.

The A/D converter 1 converts the analog equalizer signal Sae to a digital detection signal Sad, outputs the digital detection signal Sad to the equalizer 2A, and outputs it directly to the binarizing unit 5 and the phase detector 8.

The frequency characteristic after the waveform equalizing process in the analog equalizer 50 is set to be similar to the frequency characteristic obtained as a result of execution of a waveform equalizing process similar to that in the equalizer 2A in the information reproducing apparatus P2 according to the second embodiment on the detection signal Sp.

On the other hand, the equalizer 2B performs a waveform equalizing process and a high-frequency-band emphasizing process on the digital detection signal Sad on the basis of the second reference signal Srf2 output from the memory 3B, thereby generating the second equalizer signal Seq2, and outputs the second equalizer signal Seq2 to the bit-by-bit decoder 5A. The second reference signal Srf2 according to the fourth embodiment is set so as to give a frequency characteristic to the equalizer 2B so that the result of performing the waveform equalizing process on the detection signal Sp synergistically by the analog equalizer 50 and the equalizer 2B becomes equal to the result of performing a systematizing process on the digital detection signal Spd by the equalizer 2b according to the second embodiment.

Therefore, an equalizer processing part E shown by an alternately long and short dash line in FIG. 11 can be replaced with an equalizer processing part EE shown in FIG. 11 as an equivalent circuit. In the case of the equalizer processing part EE, the detection signal Sp from the pickup PU is converted by the A/D converter 1 to the digital detection signal Spd. The digital detection signal Spd undergoes the process in the analog equalizer 50 and the equalizer 2A to become an equalizer signal similar to the second equalizer signal Seq2 according to the second embodiment, and the equalizer signal is output to the bit-by-bit decoder 5A. Concurrently, the digital detection signal Spd is output to the analog equalizer 50 and subjected to a waveform equalizing process similar to that of the equalizer 2A according to the second embodiment. The resultant signal is output as an equalizer signal Saeq to the binarizing unit 5 and the phase detector 8.

Also by the operations of the information reproducing apparatus P4 according to the fourth embodiment described above, effects similar to those of the information reproducing apparatus P2 according to the second embodiment can be produced.

(VI) Fifth Embodiment

Figure 12:
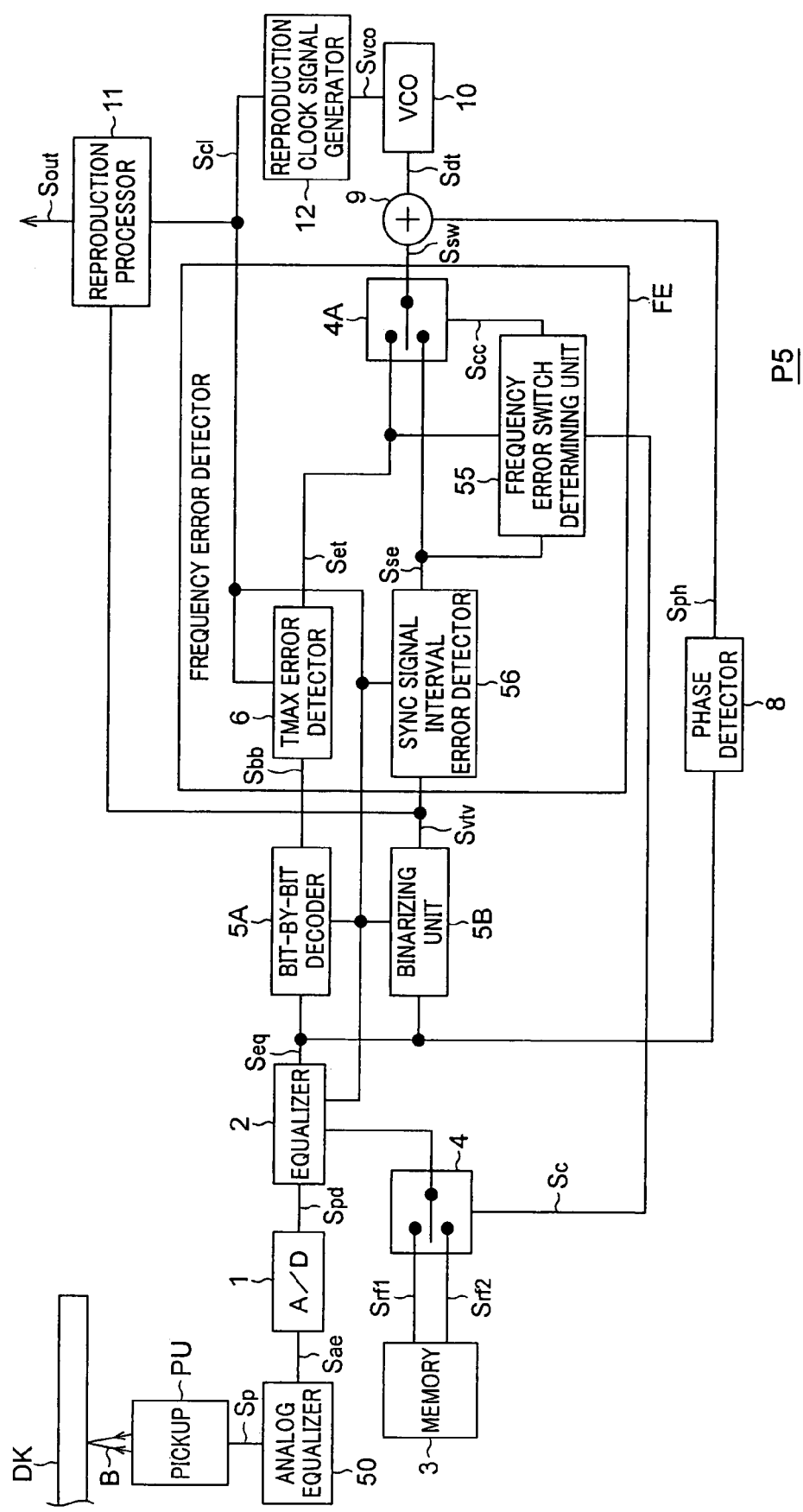
FIG. 12 is a block diagram showing a schematic configuration of an information processing apparatus according to a fifth embodiment.

Finally, a fifth embodiment as further another embodiment according to the invention will be described with reference to FIG. 12. FIG. 12 is a block diagram showing a schematic configuration of an information reproducing apparatus according to the fifth embodiment. In FIG. 12, similar reference numerals are designated to components similar to those of the information reproducing apparatus P3 according to the third embodiment (see FIG. 10), and their detailed description will not be repeated.

In the above-described third embodiment, the case where the Viterbi decoding method is used for the binarizing process for decoding and the bit-by-bit decoding method is used for the binarizing process for detecting a TMAX error in the configuration of the information reproducing apparatus P1 according to the first embodiment has been described. In the fifth embodiment to be described below, in addition to the configuration of the information reproducing apparatus P3 according to the third embodiment, the analog equalizer 50 in the information reproducing apparatus P4 according to the fourth embodiment is connected between the pickup PU and the A/D converter 1. In addition, in the information reproducing apparatus P5, as a method of detecting the difference between the frequency of the detection signal Sp and the frequency of the reproduction clock signal Scl in order to generate the addition signal Sdt for controlling the frequency of the reproduction clock signal Scl, not only the method using a TMAX error in the information reproducing apparatuses P1 to P4 of the first to fourth embodiments but also a method of controlling the VCO 10 by using the frequency difference detected on the basis of a deviation of a sync signal interval included in the equalizer signal Seq (that is, a deviation between a sync signal interval in the standard and a sync signal interval included in the equalizer signal Seq actually detected) are used in combination. Specifically, when the difference between the frequency of the detection signal Sp and the frequency of the reproduction clock signal Scl according to the first to fourth embodiments is large, a TMAX error is used to detect the difference in a manner similar to the foregoing embodiments. After the difference decreases, the detection method is switched to the method using the deviation of the sync signal interval.

Consequently, the information reproducing apparatus P5 according to the fifth embodiment has, as shown in FIG. 12, as a frequency error detector FE, in addition to the TMAX error detector 6, a sync signal interval error detector 56, a switch 4A, and a frequency error switch determining unit 55 also having the function of the determining unit 7 in the information reproducing apparatus P3 according to the third embodiment.

In the configuration, the error signal Set output from the TMAX error detector 6 is output to one of input terminals of the switch 4A and the frequency error switch determining unit 55.

In parallel with the above, the decoded signal Svtv output from the Viterbi decoder 5B is output to the reproduction processor 11 similar to that of the information reproducing apparatus P3 according to the third embodiment and also to the sync signal interval error detector 56.

The sync signal interval error detector 56 detects a deviation of the above-described sync signal interval in the decoded signal Svtv using the reproduction clock signal Scl as a reference, generates an error signal Sse, and outputs the error signal Sse to the other input terminal of the switch 4A and the frequency error switch determining unit 22.

A concrete method of generating the error signal Sse in the sync signal interval error determining unit 56 will be described.

For example, in the case where the apparatus is conformed with the Blu-ray standard, a sync pattern (9T-9T pattern) in which two recording pits having a length of 9T are continuous is preliminarily inserted every 1932 channel clocks in a recording signal recorded on the optical disk DK. The interval between the sync patterns is counted as a reference unit, and the error signal Sse indicative of the deviation between the 1932 channel clocks as the interval in the standard and the counted interval is generated.

Generally, in the method of generating the error signal Sse, it is known that when the difference between the frequency of the detection signal Sp and the frequency of the reproduction clock signal Scl exceeds about ±10%, for example, a pattern in which two recording pits having a length of 8T are continued (that is, 8T-8T pattern) is erroneously detected as the sync pattern, or the sync pattern is detected as the 8T-8T pattern so that the sync pattern cannot be detected. As a result, the VCO 10 cannot be accurately controlled.

Consequently, in the information reproducing apparatus P5 according to the fifth embodiment, for example, in the case where the difference between the frequency of the detection signal Sp and the frequency of the reproduction clock signal Scl exceeds ±6%, the control signal Scc is output from the frequency error switch determining unit 55 to switch the switch 4A so as to select the error signal Set. From the frequency error switch determining unit 55, the control signal Sc in the information reproducing apparatus P3 according to the third embodiment is also output to the switch 4.

The adder 9 adds the phase error signal Sph to the switch signal Ssw output as a result of the switching process in the switch 4A, thereby generating the addition signal Sdt, and outputs it to the VCO 10.

As the switching process in the frequency error switch determining unit 55, more concretely, in the case where the value of a TMAX error indicated by the error signal Set is less than ±10% and the deviation of the sync signal interval indicated by the error signal Sse is less than ±6%, the control signal Scc is generated to switch the switch 4A so as to select the error signal Sse and output to the switch 4A. When the value of the TMAX error exceeds ±6%, the control signal Scc is generated to switch the switch 4A to select the error signal Sst and output to the switch 4A.

On the other hand, with respect to the switching of the frequency characteristic of the equalizer 2, when the value of the TMAX error is less than ±10, the control signal Sc is generated to switch the switch 4 so as to select the first reference signal Srf1 and is output to the switch 4. When the value of the TMAX error is ±10 or larger and the error signal Set is selected in the switch 4A, the control signal Sc is generated to switch the switch 4 to select the second reference signal Srf2 and output to the switch 4.

By the above-described operation of the information reproducing apparatus P5 according to the fifth embodiment, in addition to the effect of the operation of the information reproducing apparatus P3 according to the third embodiment, the method of detecting and using a TMAX error and the method of detecting and using a deviation of the sync signal interval are used while being switched for controlling the VCO 10. Consequently, the VCO 10 is controlled more accurately so that the reproduction clock signal Scl can be generated.

In the foregoing embodiments, the case of applying the invention to the information reproducing apparatus for reproducing AV information or the like recorded on the optical disk DK has been described. Other than this case, the invention can be also applied to the case of detecting address information or the like for a recording process in an information recording apparatus for optically recording information on an optical disk for recording.

In the first, third, or fifth embodiment, by recording a program indicating the operation of the determining unit 7 according to the first or third embodiment or the operation of the frequency error switch determining unit 55 according to the fifth embodiment on an information recording medium such as a flexible disk or hard disk or obtaining the program via the Internet or the like and recording it on the information recording medium and reading and executing the program by a general computer, the computer can also be utilized as the determining unit 7 or the frequency error switch determining unit 55.

What is claimed is:

1. An information reproducing apparatus for decoding and reproducing information recorded on a recording medium by using a detection signal detected from the recording medium while compensating the difference between frequency of the detection signal and frequency of a reproduction reference signal as a reference used at the time of reproducing the information by using the detection signal, comprising:
   a detecting device which detects the difference; and
   a level control device, when the detected difference is equal to or larger than a preset frequency difference, which performs a level control process for compensation on the detection signal, the process increasing level of the detection signal corresponding to a frequency band equal to or higher than a preset threshold frequency to be higher than level of the detection signal corresponding to the frequency band when the difference is less than the frequency difference, and outputs the resultant signal to the detecting device.

2. The information reproducing apparatus according to claim 1,
wherein when the difference becomes less than the frequency difference as a result of the level control process for compensation, the level control device stops executing the level control process for compensation on the detection signal.

3. The information reproducing apparatus according to claim 1, further comprising:
a digitizing device which converts the detection signal to a digital detection signal; and
a binarizing device which binarizes the generated digital detection signal to generating a binarized detection signal,
wherein the detecting device detects the difference by using the binarized detection signal, and
when the detected difference is equal to or larger than the frequency difference, the level control device performs the level control process for compensation on the detection signal, the process increasing level of the digital detection signal corresponding to a frequency band equal to or higher than the threshold frequency to be higher than level of the digital detection signal corresponding to the frequency band when the difference is less than the frequency difference, and outputs the resultant signal to the detecting device.

4. The information reproducing apparatus according to claim 1,
wherein when the frequency of the detection signal is higher than frequency of the reproduction reference signal and the frequency difference corresponds to 10 percent of the frequency of the reproduction reference signal, the level control device performs the level control process for compensation on the detection signal, and outputs the processed signal to the detecting device.

5. The information reproducing apparatus according to claim 3, further comprising a reproducing device which decodes and reproduces the information,
wherein the reproducing device is a maximum likelihood decoding device which decodes the information by a maximum likelihood decoding process using the detection signal and
the detecting device detects the difference on the basis of the detection signal which is not yet input to the reproducing device.

6. The information reproducing apparatus according to claim 1, further comprising, a decoding level control device which controls the level of the detection signal in accordance with frequency, based on a pre-set reference signal used in the case where the difference is lower than the frequency difference.

7. The information reproducing apparatus according to claim 1, further comprising:
a first detecting device which detects the difference on the basis of a longest recording mark signal included in the detection signal in correspondence with a longest recording mark used at the time of recording the information onto the recording medium;
a second detecting device which detects the difference on the basis of interval of sync signals included in the information reproduced by the reproducing device; and
a selecting device, when pulse width of the longest recording mark signal is longer than preset reference pulse width and the interval is longer than preset reference interval, which selects the first detecting means as the detecting means for detecting the difference,
wherein when the first detecting device is selected by the selecting device, the level control device performs the level control process for compensation on the detection signal, and outputs the processed detection signal to the first detecting device.

8. An information reproducing method for decoding and reproducing information recorded on a recording medium by using a detection signal detected from the recording medium while compensating the difference between frequency of the detection signal and frequency of a reproduction reference signal as a reference used at the time of reproducing the information by using the detection signal, comprising:
a detecting process of detecting the difference by a detecting device; and
a level control process, when the detected difference is equal to or larger than a preset frequency difference, of performing a level control process for compensation on the detection signal, the level control process for compensation increasing level of the detection signal corresponding to a frequency band equal to or higher than a preset threshold frequency to be higher than level of the detection signal corresponding to the frequency band when the difference is less than the frequency difference, and outputting the resultant signal to the detecting device.

* * * * *